United States Patent [19]
Kawanobe et al.

[11] Patent Number: 6,046,510
[45] Date of Patent: Apr. 4, 2000

[54] CONTROL SYSTEM FOR ELECTRIC DEVICES INSTALLED IN AUTOMOTIVE SLIDE DOOR

[75] Inventors: Osamu Kawanobe, Kanagawa; Tomoaki Monzen, Chiba, both of Japan

[73] Assignee: Ohi Seisakusho Co., Ltd., Yokohama, Japan

[21] Appl. No.: 09/044,861

[22] Filed: Mar. 20, 1998

[30] Foreign Application Priority Data

Mar. 21, 1997 [JP] Japan ..................................... 9-067544
Mar. 21, 1997 [JP] Japan ..................................... 9-067545

[51] Int. Cl.$^7$ ....................................................... B60J 5/06
[52] U.S. Cl. ............................. 307/10.1; 49/26; 180/289; 296/146.1; 318/282; 318/466
[58] Field of Search .............................. 307/10.1; 49/139, 49/26, 28; 318/280, 282, 466, 469; 296/146.1, 146.4; 180/289

[56] References Cited

U.S. PATENT DOCUMENTS 4,553,625  11/1985  Tsuge et al. ............................. 180/268
5,039,925   8/1991  Schap ..................................... 318/282
5,083,397   1/1992  Koura ........................................ 49/28
5,263,762  11/1993  Long et al. .......................... 296/146.4
5,594,283   1/1997  Bartel et al. ........................... 307/10.1

FOREIGN PATENT DOCUMENTS 2-14920   1/1990   Japan .

Primary Examiner—Albert W. Paladini
Attorney, Agent, or Firm—Foley & Lardner

[57] ABSTRACT

A control system is provided for controlling electric devices installed in a slide door which moves relative to a door opening formed in a vehicle body. The control system comprises a first electric device for detecting a door-closed condition wherein the slide door is at its fully closed position relative to the door opening and a second electric device for positively suppressing operation of the electric devices until the time when the first electric device detects the door-closed condition. For achieving communication between the first and second electric devices, an electromagnetic induction phenomenon is practically used.

9 Claims, 18 Drawing Sheets

FIG. 8

| | SWITCH CONTROL FROM VEHICLE BODY | | | | CONTENTS OF COMMUNICATION | COMMUNICATION DATA | | | | | | | |
|---|---|---|---|---|---|---|---|---|---|---|---|---|---|
| | CENTRALIZED DOOR LOCK SW. | | POWER WINDOW SW. | | | HIGHER GROUP | | | | LOWER GROUP | | | |
| | UNLOCK | LOCK | DOWN | UP | | 3-BITS | 2-BITS | 1-BIT | 0-BIT | 3-BITS | 2-BITS | 1-BIT | 0-BIT |
| 108 | OFF | OFF | OFF | OFF | SW. OFF | 0 | 0 | 0 | 0 | 0 | 0 | 0 | 0 |
| 104 | OFF | OFF | OFF | (ON) | P/W - UP | 0 | 0 | 0 | 0 | 0 | 0 | 0 | (1) |
| 105 | OFF | OFF | (ON) | OFF | P/W - DOWN | 0 | 0 | 0 | 0 | 0 | 0 | (1) | 0 |
| 106 | OFF | (ON) | OFF | OFF | DOOR LOCK | 0 | 0 | 0 | 0 | 0 | 0 | (1) | (1) |
| 107 | (ON) | OFF | OFF | OFF | DOOR UNLOCK | 0 | 0 | 0 | 0 | 0 | (1) | 0 | 0 |
| 109 | OFF | OFF | — | — | C.R.M.T.I. FLAG | 0 | 0 | 0 | 0 | 0 | (1) | 0 | (1) |
| 110 | OFF | (ON) | OFF | (ON) | DOOR SW. OPERATION DISREGARD | 0 | 0 | 0 | 0 | 0 | (1) | (1) | 0 |
| 111 | (ON) | OFF | (ON) | OFF | D.S.O.D. CANCEL | 0 | 0 | 0 | 0 | (1) | (1) | (1) | (1) |
| 112 | OFF | (ON) | (ON) | OFF | CLOSURE LOCK | 0 | 0 | 0 | 0 | (1) | 0 | 0 | 0 |
| 113 | (ON) | OFF | OFF | OFF | CLOSURE LOCK CANCEL | 0 | 0 | 0 | 0 | (1) | 0 | (1) | 0 |

101 / 102 / 103

BODY-SIDE

FIG.9

| | SWITCH CONTROL FROM SLIDE DOOR | | | CONTENTS OF COMMUNICATION | COMMUNICATION DATA | | | | | | | |
|---|---|---|---|---|---|---|---|---|---|---|---|---|
| | | | | | HIGHER GROUP | | | | LOWER GROUP | | | |
| | HALF-EDGE | HANDLE | HALF-LATCH | | 3-BITS | 2-BITS | 1-BIT | 0-BIT | 3-BITS | 2-BITS | 1-BIT | 0-BIT |
| 124 | OFF | OFF | OFF | HALF-LATCH | 0 | 0 | 0 | 0 | 0 | 0 | 0 | 0 |
| | ON | | | | 0 | 0 | 0 | 0 | 0 | 0 | 0 | (1) |
| 125 | | | | C.O.C.I. FLAG | 0 | 0 | 0 | 0 | 0 | 0 | (1) | 0 |
| | | | | | 0 | 0 | 0 | 0 | 0 | 0 | (1) | (1) |

121     122     123

DOOR-SIDE

CONTROL SYSTEM FOR ELECTRIC DEVICES INSTALLED IN AUTOMOTIVE SLIDE DOOR

BACKGROUND OF THE INVENTION

1. Field of the Invention

The present invention relates in general to a control system for controlling automotive electric devices, and more particularly to a control system for controlling electric devices installed in an automotive slide door. More specifically, the present invention is concerned with a control system for controlling the door-installed electric devices by control switches which are installed in a vehicle body.

2. Description of the Prior Art

In order to clarify the task of the present invention, one conventional control system of the above-mentioned type will be described with reference to FIG. 19.

For providing an electric connection between electric devices installed in a slide door and an electric power source installed in a vehicle body, there has been commonly used a contact pin type connector such as a connector 501 as shown in FIG. 19. The electric devices in the slide door are a door closure unit 502, a power window unit 503, an electromagnetic door lock unit 504 and the like. These units 502, 503 and 504 are remotely controlled by control switches which are installed in an associated vehicle body, such as, in driver's and/or passenger's cabin of the vehicle.

The contact pin type connector 501 generally comprises a body-side connector part 501a mounted to the vehicle body and a door-side connector part 501b mounted to the slide door. When, under closing movement, the slide door comes to or near to a half-latched position thereof, the door-side connector part 501b comes to contact with the body-side connector part 501a to provide an electric connection between the door-installed electric devices and the body-installed control switches. Upon this, the door-installed electric devices can be remotely controlled by the control switches.

However, due to unstable condition of the slide door assuming the half-latched position, the contact between the two connector parts 501a and 501b is very unstable, which tends induce malfunction or poor operation of the door-installed electric devices.

Japanese Patent First Provisional Publication 2-14920 shows a communication system which establishes a communication between a body-side control circuit and a door-side control circuit by using an infrared. For the communication, the door has an infrared ray emitter mounted thereto and the vehicle body has an infrared ray detector mounted thereto. However, due to nature of the infrared ray, this communication system tends to lower its performance greatly when at least one of the emitter and the detector is soiled. In fact, it is difficult to keep such devices clean because they have to be exposed to the open air when the slide door is opened.

SUMMARY OF THE INVENTION

It is therefore an object of the present invention to provide a control system for controlling door-installed electric devices remotely from body-installed control switches, which is free of the above-mentioned drawbacks.

According to a first aspect of the present invention, there is provided a control system for controlling electric devices installed in a slide door which moves relative to a door opening formed in a vehicle body. The control system comprises first means for detecting a door-closed condition wherein the slide door is at its fully closed position relative to the door opening; and second means for positively suppressing operation of the electric devices until the time when the first means detects the door-closed condition.

According to a second embodiment of the present invention, there is provided a control system for controlling electric devices installed in a slide door which moves relative to a door opening formed in a vehicle body. The control system comprises a body-side control circuit installed in the vehicle body and connected to control switches installed in the vehicle body; a door-side control circuit installed in the slide door and including first means which detects a door-closed condition wherein the slide door is at its fully closed position relative to the door; and a connector which electrically connects the body-side and door-side control circuits when the slide door comes to the closed position and electrically disconnects the control circuits when the slide door moves away from the closed position, wherein the door-side control circuit further includes second means which, until the time when the first means detects the door-closed condition, positively suppresses operation of the electric devices, the operation being instructed from the body side control circuit through the connector.

According to a third aspect of the present invention, there is provided a control system for use in a motor vehicle which includes a vehicle body and a slide door. The control system comprises a body-side control circuit installed in the vehicle body and including; a door-side control circuit installed in the slide door; two coil elements respectively mounted to the vehicle body and the slide door and respectively connected to the body-side and door-side control circuits, the two coil elements coming close to each other when the slide door comes to its closed position relative to a door opening formed in the vehicle body; and means for providing a radio or wireless communication between the body-side and door-side control circuits by practically using an electromagnetic induction generated between the two coil elements.

According to a fourth aspect of the present invention, there is provided a control system for use in a motor vehicle. The vehicle includes a vehicle body, a slide door, electric devices mounted in said slide door, an electric door closure unit for shifting the slide door from a half-latched position to a full-latched position when actuated, a first group of control switches mounted in the vehicle body, and a second group of control switches mounted in the slide door. The control system controls the door-mounted electric devices in accordance with operation of the first and second group of switches. The control system comprises a body-side control circuit installed in the vehicle body and electrically connected to the first group of control switches; a door-side control circuit installed in the slide door and electrically connected to the second group of control switches, the door-mounted electric devices and the electric door closure unit; and a connector arranged between the vehicle body and the slide door, which comprises a pin type connection section through which an electric power supply is achieved from the body-side control circuit to the door-side control circuit when the slide door comes to a half-latched position under closing movement thereof, and a coil element section through which radio connection is achieved between the body-side and door-side control circuits so that the door-mounted electric devices are controlled in accordance with operation of the first and second group of control switches, wherein the door-side control circuit suppresses the operation of the coil element section of the connector until the electric door closure unit shifts the slide door from the half-latched position to the full-latched position.

BRIEF DESCRIPTION OF THE DRAWINGS

Other objects and advantages of the present invention will become apparent from the following description when taken in conjunction with the accompanying drawings, in which:

FIG. 8 is a table showing communication data of the control signal transmitted from the body-side control circuit to the door-side control circuit;

FIG. 9 is a table showing communication data of the control signal transmitted from the door-side control circuit to the body-side control circuit;

FIG. 10 is an illustration showing various types of waveforms of a control signal produced when a power window up-switch is turned ON;

DETAILED DESCRIPTION OF THE EMBODIMENTS

Referring to FIGS. 1 to 12, there is shown a control system 10A which is a first embodiment of the present invention.

Figure 1:
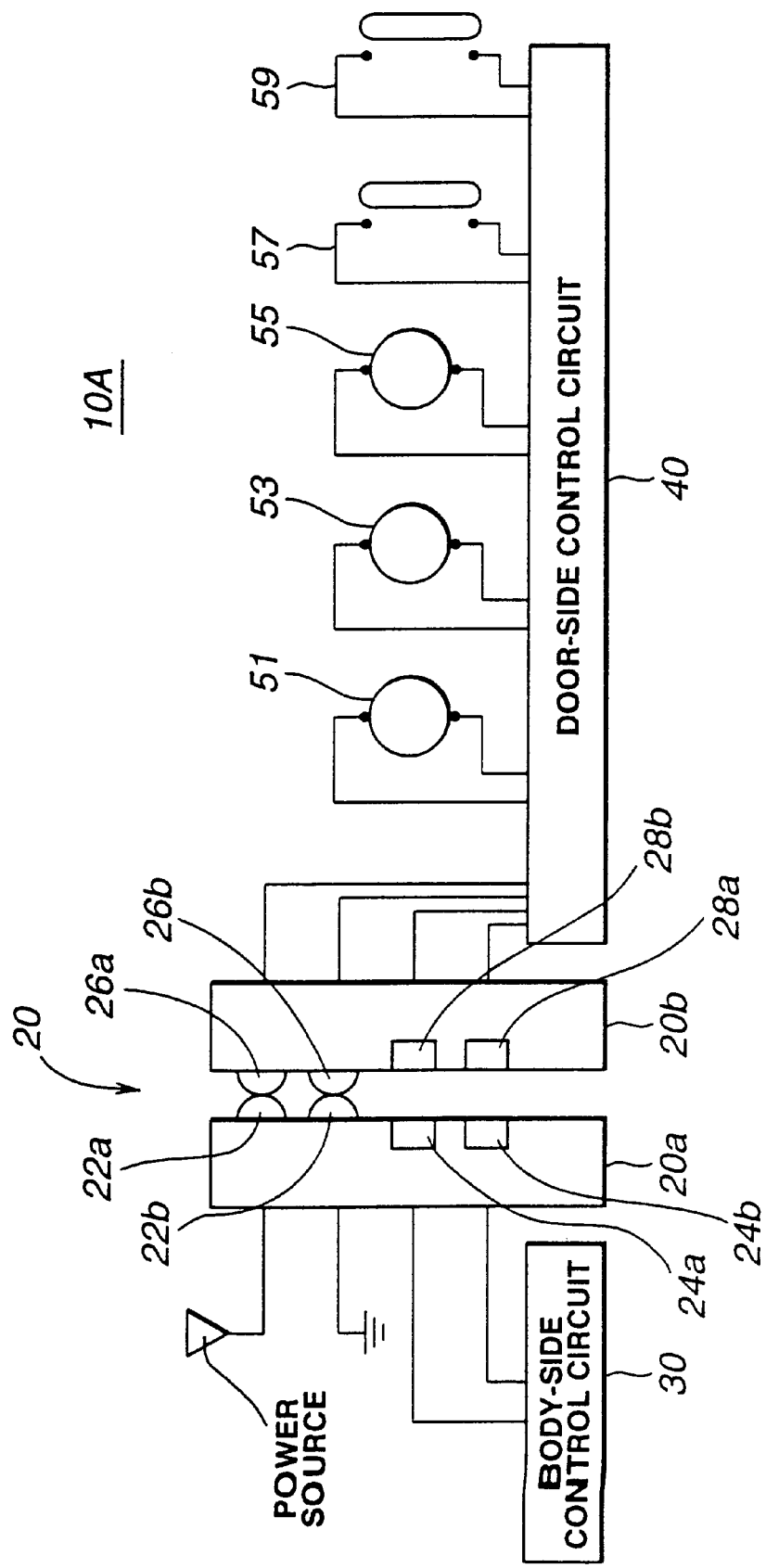
FIG. 1 is a block diagram of a control system which is a first embodiment of the present invention.

As is seen from FIG. 1, the control system 10A comprises generally a body-side control circuit 30 which is installed in a vehicle body and connected to various control switches installed in a driver's or passenger's cabin and a door-side control circuit 40 which is installed in a slide door and connected to various electric devices installed in the slide door.

Between the body-side control circuit 30 and the door-side control circuit 40, more specifically, between the vehicle body and the slide door which slides relative to the vehicle body, there is arranged a connector 20 for providing the two control circuits 30 and 40 an electric connection as well as a radio or wireless connection.

The connector 20 comprises a body-side connector part 20a mounted to the vehicle body and a door-side connector part 20b mounted to the slide door. The two connector parts 20a and 20b are so arranged that they face each other when the slide door comes to or near its closed position in a door opening formed in the vehicle body.

The connector 20 comprises a pin type connector section through which an electric power supply can be made from a body-side electric power source (viz., battery) to the door-side control circuit 40, and a coil element section through which a radio or wireless communication can be made between the body-side control circuit 30 and the door-side control circuit 40.

More specifically, the body-side connector part 20a includes connecting pins 22a and 22b to which a power source is connected through an electric wire and the vehicle body. The body-side connector part 20a further includes a signal transmission coil element 24a and a signal receiving coil element 24b to which the body-side control circuit 30 is connected through respective wires. These coil elements 24a and 24b are coated with an electrically insulating and weather proof plastic film. The transmission coil element 24a is used for transmitting control signals from the body-side control circuit 30 to the door-side control circuit 40, while, the receiving coil element 24b is used for receiving control signals transmitted thereto from the door-side control circuit 40.

The door-side connector part 20b includes connecting pins 26a and 26b to which a power input section of the door-side control circuit 40 is connected through respective wires. The door-side connector part 20b further includes a signal receiving coil element 28b and a signal transmission coil element 28a to which the door-side control circuit 40 is connected through respective wires. These coil elements 28b and 28a are coated with an electrically insulating and weather proof plastic film.

The door-side control circuit 40 is connected to a power window unit 51, an actuator 53 of an electromagnetic door lock/unlock unit and a door closure unit 55. The closure unit 55 is a power device for driving the slide door from a half-latched position to a full-latched position with usage of an electric power. A half-latch detecting switch 57 and a door handle switch 59 are connected to the door-side control circuit 40 through respective wires. The half-latch detecting switch 57 senses the half-latched condition of the slide door, and the door handle switch 59 senses a manipulation of inside and outside door handles. More specifically, the half-latch detecting switch 57 is turned ON when the slide door comes to the half-latched position in the door opening of the vehicle body.

Figure 2:
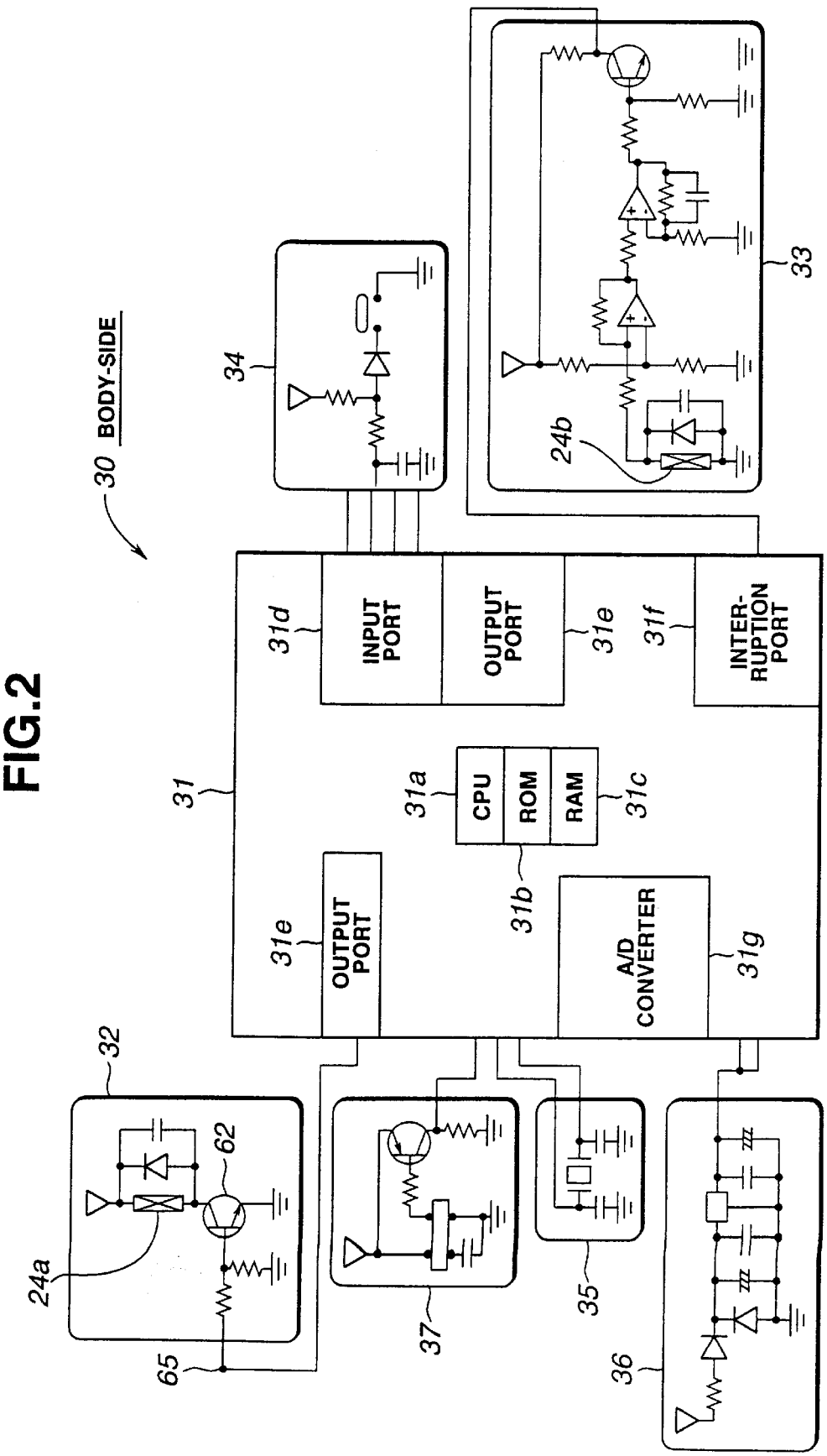
FIG. 2 is a block diagram of a body-side control circuit employed in the first embodiment.

FIG. 2 shows the detail of the body-side control circuit 30. As shown, the body-side control circuit 30 comprises a one-tip type microprocessor 31 and its peripheral circuits. The one-tip type microprocessor 31 comprises a CPU (central processing unit) 31a, a ROM (read only memory) 31b, a RAM (random access memory) 31c, input and output ports 31d and 31e and an A/D converter (analog/digital converter) 31g. The microprocessor 31 further comprises an interruption terminal port 31f through which an external event is inputted into the microprocessor 31.

The peripheral circuits of the microprocessor 31 are a signal transmission circuit 32 which drives the transmission coil element 24a, and a signal receiving circuit 33 which, based on an electromotive force generated by the receiving coil element 24b, regenerates a control signal transmitted thereto from the aftermentioned door-side control circuit 40. Various control switches, such as a door unlock switch, a door lock switch, a power window up-switch, a power window down-switch and the like are connected to the microprocessor 31 through a pull-up circuit 34.

A system clock oscillation circuit 35, a 5V-power circuit 36 and a reset circuit 37 are also connected to the microprocessor 31, as shown. The clock oscillating circuit 35 generates operation base pulses for the microprocessor 31, and the power circuit 36 provides the microprocessor 31 with an electric power of 5 (five) volts.

Figure 3:
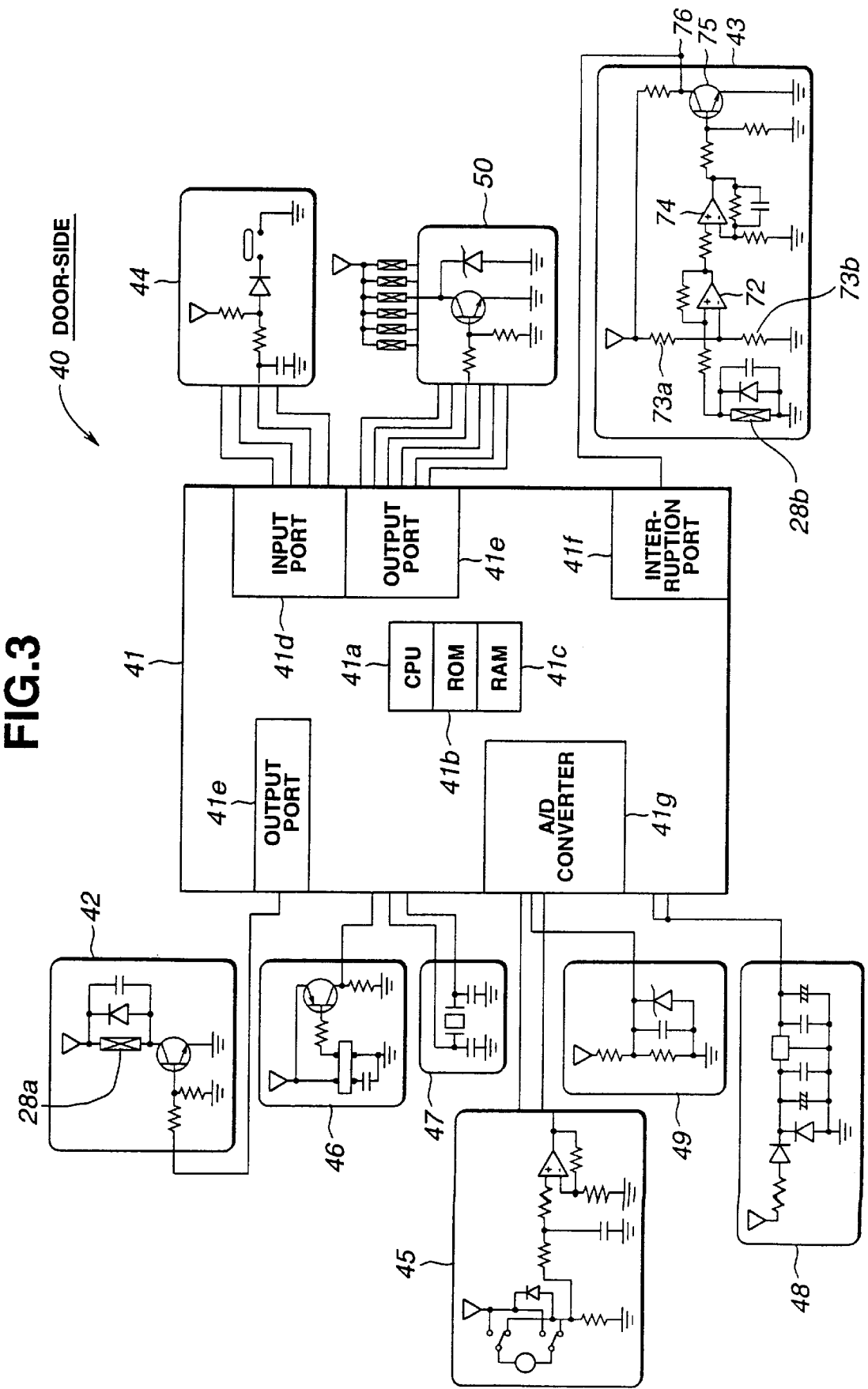
FIG. 3 is a block diagram of a door-side control circuit employed in the first embodiment.

FIG. 3 shows the detail of the door-side control circuit 40. As shown, similar to the above-mentioned body-side control circuit 30, the door-side control circuit 40 comprises a one-tip type microprocessor 41 and its peripheral circuits. The one-tip type microprocessor 41 comprises a CPU 41a, a ROM 41b, a RAM 41c, input and output ports 41d and 41e, an A/D converter 41g and an interruption terminal port 41f.

The peripheral circuits of the microprocessor 41 are a signal transmission circuit 42 which drives the transmission coil element 28a, and a signal receiving circuit 43 which, based on an electromotive force generated by the receiving coil element 28b, regenerates a control signal transmitted thereto from the above-mentioned body-side control circuit 30. Various control switches, such as a power window up-switch, a power window down-switch, the above-mentioned half-latch detecting switch 57, the above-mentioned door handle switch 59 and the like are connected to the microprocessor 41 through a pull-up circuit 44.

A relay drive circuit 50 is also connected to the microprocessor 41. The relay drive circuit 50 is a circuit for driving a relay circuit which controls operation of the actuator 53 of the electromagnetic door lock/unlock unit, a relay circuit which controls operation of the power window unit 51 and a relay circuit which controls operation of the closure unit 55. A current amplifying circuit 45 is connected to the microprocessor 41, which, for monitoring the operation of the power window unit 51 and the closure unit 55, amplifies a current signal which varies in accordance with the operation of the units 51 and 55.

A system clock oscillation circuit 47, a 5V-power circuit 48, a reset circuit 46 and a voltage dividing circuit 49 are also connected to the microprocessor 41. The voltage dividing circuit 49 monitors the voltage of an electric power supplied from the vehicle body through the connector 20.

Figure 4:
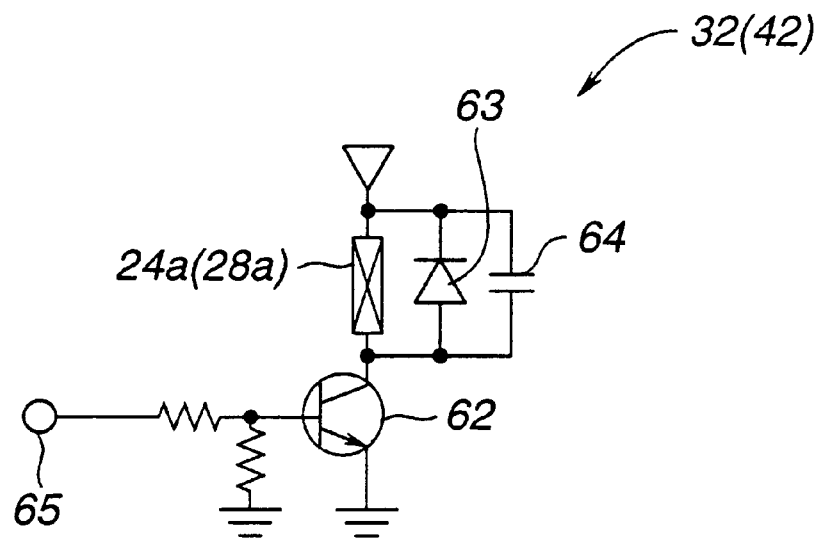
FIG. 4 is a block diagram of a signal transmission circuit used in each of the body-side and door-side control circuits employed in the first embodiment.

FIG. 4 shows the detail of the signal transmission circuit 32 or 42. As shown, the transmission circuit 32 or 42 comprises the coil element 24a or 28a and a switching transistor 62 which are connected in series between an electric power source and an earthed vehicle body. A diode 63 and a condenser 64 are connected to the coil element 24a or 28a in series. The base of the transistor 62 is connected to a junction part between two resistors, one resistor having an opposite terminal connected to the earthed vehicle body and the other resistor having an opposite terminal which serves as an input terminal 65 of the transmission circuit 32 or 42. By applying a higher or lower voltage to the input terminal 65, the switching transistor 62 provides ON or OFF condition between the collector and the emitter and thus controls a current feeding to the coil element 24a or 28a. With this, a magnetic flux or a magnetic field generated by the coil element 24a or 28a is changed.

Figure 5:
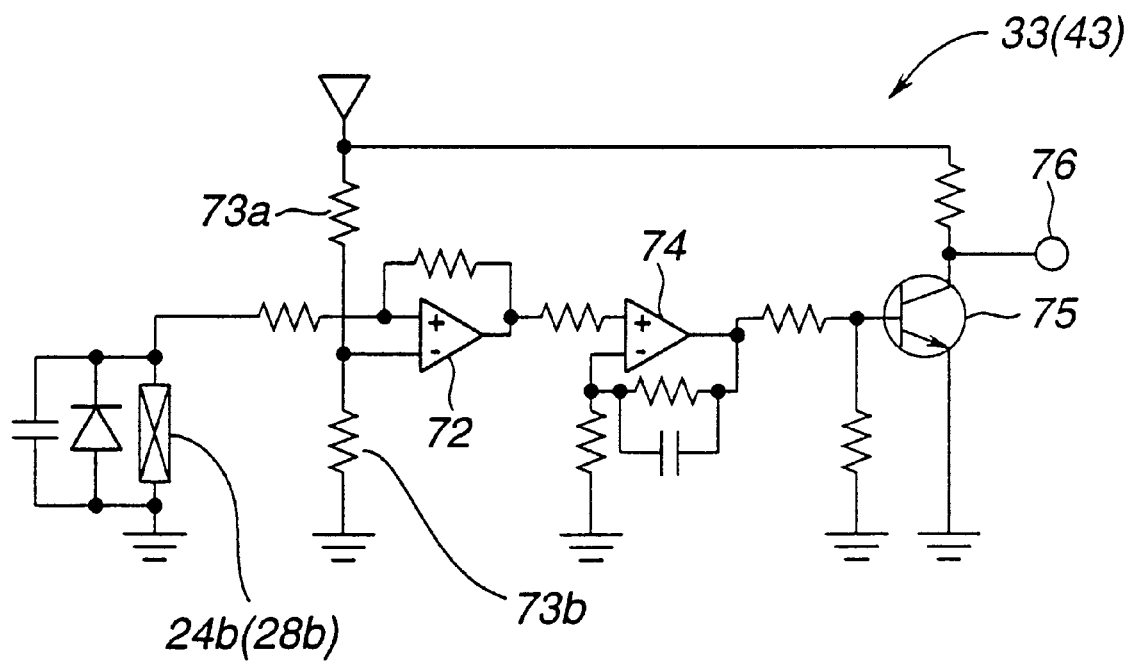
FIG. 5 is a block diagram of a signal receiving circuit used in each of the body-side and door-side control circuits employed in the first embodiment.

FIG. 5 shows the detail of the signal receiving circuit 33 or 43. As shown, the receiving circuit 33 or 43 comprises the coil element 24b or 28b to which a diode (no numeral) and a condenser (no numeral) are connected in series. A comparator 72 is connected to the coil element 24b or 28b. That is, one terminal of the coil element 24b or 28b is connected to a positive input terminal of the comparator 72 through a register (no numeral). A negative input terminal of the comparator 72 is connected to a junction part between two resistors 73a and 73b, the resistor 73a having an opposite terminal connected to an electric power source, and the other resistor 73b having an opposite terminal connected to the earthed vehicle body. A resistor (no numeral) extends between the positive input terminal of the comparator 72 and an output terminal of the same. Another comparator (viz., operational amplifier) 74 is connected to the comparator 72. That is, a positive input terminal of the comparator 74 is connected to the output terminal of the comparator 72 through a resistor (no numeral) and a negative input terminal of the comparator 74 is connected to the earthed vehicle body through a resistor (no numeral). A resistor (no numeral) and a condenser (no numeral) are connected in series, which extend between the negative input terminal of the comparator 74 and an output terminal of the same. A transistor 75 is connected to the comparator 74. That is, the base of the transistor 75 is connected to the output terminal of the comparator 74 through a resistor (no numeral). The base of the transistor 75 is connected to the earthed vehicle body through a resistor (no numeral). The collector of the transistor 75 is connected to the electric power source through a resistor (no numeral) and the emitter of the transistor 75 is connected to the earthed vehicle body. The collector of the transistor 75 is connected to an output terminal 76.

That is, upon changing of magnetic flux generated by the coil element 28a or 24a of the above-mentioned signal transmission circuit 42 or 32, the coil element 24b or 28b of the signal receiving circuit 33 or 43 generates corresponding electromotive force. The electromotive force is applied to the comparator 72. Output from the comparator 72 is applied to the operational-amplifier 74, and output from the operational-amplifier 74 is applied to the base of the transistor 75. Accordingly, the transistor 75 serves as a reversing means allowing the output terminal 76 to issue a signal whose waveform is reversed to that of the output from the operational-amplifier 74.

Figure 6:
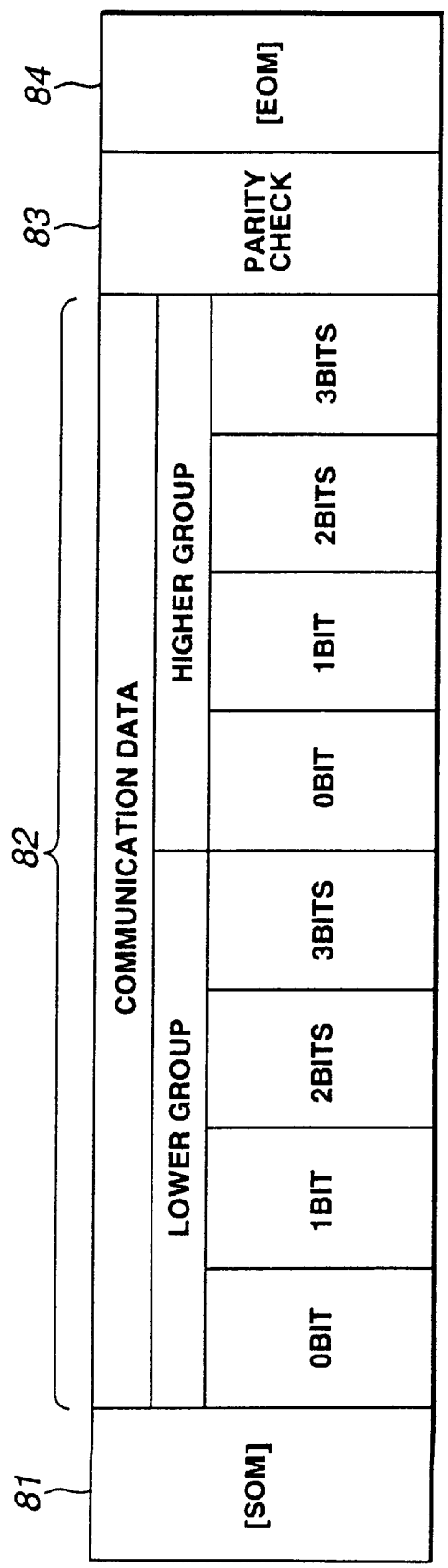
FIG. 6 is an illustration showing data construction of a control signal which is transmitted between the body-side and door-side control circuits.

FIG. 6 shows the data construction of the control signal which is transmitted between the body-side control circuit 30 and the door-side control circuit 40 through the respective coil elements 24a and 28b (or, 28a and 24b). As shown, the control signal includes a section 81 of start of message (SOM), a section 82 of communication data represented by eight bits, a section 83 of parity check and a section 84 of end of message (EOM). That is, between the body-side control circuit 30 and the door-side control circuit 40, the control signal having the above-mentioned data construction is transmitted in a serial transmission manner.

Figure 7:
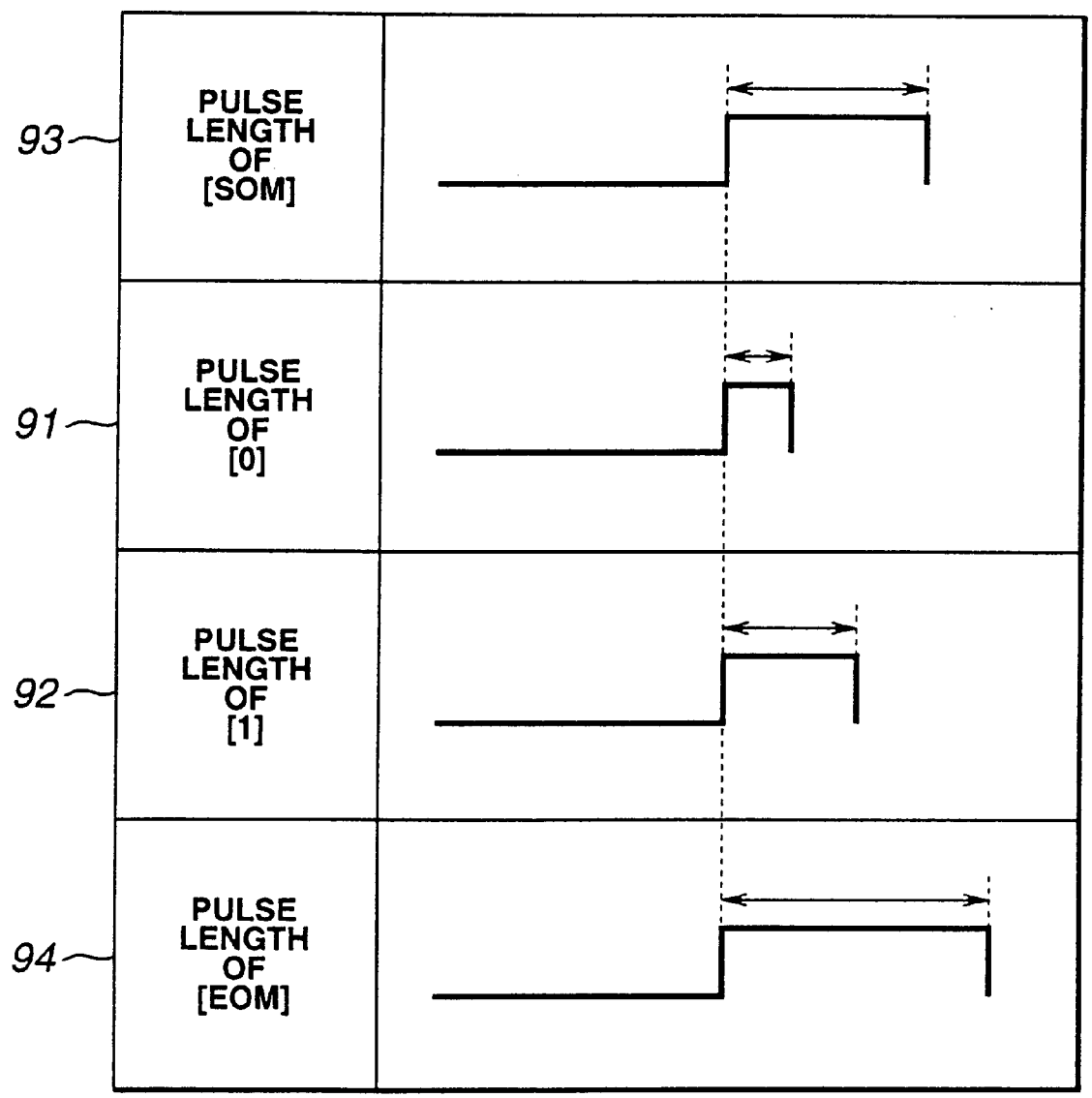
FIG. 7 is an illustration showing the waveforms of each section of the control signal shown in FIG. 6.

FIG. 7 shows the waveform of each section of the control signal. In the signal transmission, a so-called pulse wise modulation (PWM) method is employed, so that the definition of each data is made depending on the time for which high level condition is maintained. The pulse length of the waveform 91 representing [0] is the shortest, and the pulse length of the waveform 92 representing [1] is about twice as long as that of the waveform of [0]. The pulse length of the waveform 93 representing the start of message (SOM) is about three times as long as that of the waveform of [0], and the pulse length of the waveform 94 representing the end of message (EOM) is about four times as long as that of the waveform of [0].

FIG. 8 is a table showing communication data of the control signal which is transmitted from the body-side control circuit 30 to the door-side control circuit 40. In the table, the left column 101 shows ON/OFF condition of various control switches mounted in a driver's cabin in the vehicle body, the center column 102 shows the meaning of the control aimed by the ON/OFF operation of the control switches and the right column 103 shows bit data in the communication signal.

As is seen from the table, when the power window upswitch is turned ON (that is, in case of the item of 104), a control signal of 02H data (hexadecimal value) is transmitted. When the power window down-switch is turned ON (that is, in case of the item 105), a control signal of 03H data is transmitted. When the door lock switch is turned ON (that is, in case of the item 106), a control signal of 04H data is transmitted. When the door unlock switch is turned ON (that is, in case of the item 107), a control signal of 05H data is transmitted. The item of 108 shows a so-called "switch off condition" which takes place when a condition change is carried out from a condition wherein some of the control switches are ON to a condition wherein all of the control switches are OFF. In this case, a control signal of 01H data is transmitted. That is, for example, when the power window upswitch is turned ON, the control signal of 02H data is transmitted, and when thereafter the power window up-switch is turned OFF, that is, released from the operator's hand, the control signal of 01H data is transmitted.

For transmitting a so-called "communication recognition mode termination indicating flag" (that is, in case of the item 109), a control signal of 06H data is provided, and for transmitting a disregarding instruction to disregard operation of door-mounted control switches (that is, in case of the item 110), a control signal of 07H data is provided, and for transmitting instruction to cancel the disregarding instruction (that is, in case of the item 111), a control signal of 08H data is provided. For transmitting a locking instruction to lock the slide door at a closed position, a control signal of 09H data is provided, and for transmitting instruction to cancel the locking instruction, a control signal of OAH data is provided. The locking and unlocking of the slide door are achieved by the door closure unit 55. When, with the slide door being unlocked by the door closure unit 55, the inside or outside door handle is manipulated, the slide door is permitted to move in the opening direction.

FIG. 9 is a table showing communication data of the control signal which is transmitted from the door-side control circuit 40 to the body-side control circuit 30. In the table, the left column 121 shows ON/OFF condition of various control switches mounted in the slide door, the center column 122 shows the meaning of the control aimed by the ON/OFF operation of the control switches and the right column 123 shows bit data in the communication signal.

As is seen from the table, when the slide door is in a half-latched condition (that is, in case of the item 124), a control signal of 01H data is provided. For transmitting a so-called "closure operation completion indicating flag" (that is, in case of the item 125), a control signal of 02H data is provided. That is, the flag is issued when the slide door has come to its fully closed locked position due to completion of operation of the door closure unit 55.

In the following, a signal transmission between the body-side and door-side control circuits 30 and 40 will be described.

Since the signal transmission manner from the body-side control circuit 30 to the door-side control circuit 40 and the signal transmission manner from the door-side control circuit 40 to the body-side control circuit 30 are substantially the same, the following explanation will be directed to only the transmission from the body-side control circuit 30 to the door-side control circuit 40.

As is seen from FIG. 2, when, for example, the power window up-switch is turned ON, the pull-up circuit 34 causes a corresponding input port 31d of the microprocessor 31 to assume its lower level. Upon this, the CPU 31a of the microprocessor 31 issues a corresponding control signal to the signal transmission circuit 32 through the output port 31e. For example, in such case, a control signal including a section of SOM, a section of 02H data, a section of parity bit [0] and a section of EOM is applied to the signal transmission circuit 32 from the microprocessor 31.

Figure 10:
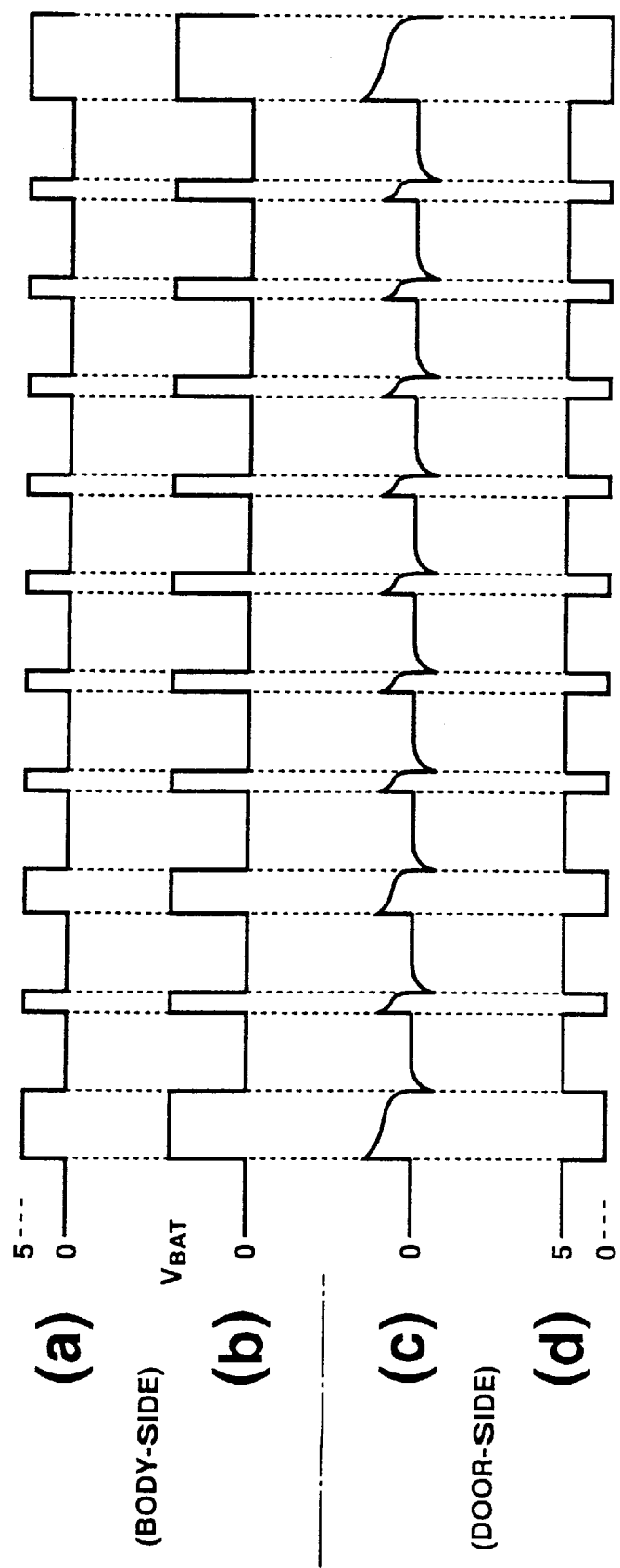

FIG. 10 shows various types of waveforms of the control signal which is produced when the power window up-switch is turned ON. In the drawing, reference (a) indicates the control signal applied to the input terminal 65 of the signal transmission circuit 32 of FIG. 2. The control signal is applied to the base of the switching transistor 62. During the time for which the voltage of the control signal is in a higher level, the switching transistor 62 keeps ON condition, and during the time for which the voltage of the signal is in a lower level, the switching transistor 62 keeps OFF condition. Accordingly, the collector voltage of the transistor 62, that is, the voltage appearing at the junction point between the coil element 24a and the collector of the transistor 62 shows such a waveform as indicated by reference (b). Thus, in accordance with the control signal, the current flowing in the coil element 24a is changed producing a corresponding magnetic flux.

Upon receiving the magnetic flux thus generated by the body-side coil element 24a, the door-side coil element 28b (see FIGS. 1 and 3) generates an electromotive force. That is, upon receiving the magnetic flux, the coil element 28b generates a signal whose waveform is indicated by reference (c) in FIG. 10. By comparing a threshold voltage value obtained by the two resistors 73a and 73b and a voltage generated by the coil element 28b, the comparator 72 carries out a binary coding to obtain a square wave of the voltage. The voltage signal from the comparator 72 is amplified by the operational amplifier 74 and treated by the transistor 75 to show such a waveform as indicated by reference (d) in FIG. 10. That is, in the waveform of pulse signal of reference (d), the amplitude represents the power voltage (viz., 5 volts) and the phase is reversed with respect to the control signal (a) applied to the body-side signal transmission circuit 32. Thus, from the output terminal 76 of the door-side signal receiving circuit 43, the pulse signal having the above-mentioned waveform of (d) is issued.

As is seen from FIG. 3, the pulse signal from the door-side signal receiving circuit 43 is led into interruption terminal port 41f of the microprocessor 41. Regarding that the period for which the lower level part of the pulse signal is kept applied to the interruption terminal port 41f is the period for which the higher level part of the control signal (a) applied to the body-side signal transmission circuit 32, the door-side microprocessor 41 processes the contents of the control signal.

In case of FIG. 10, recognizing issuance of a control signal of 02H data from the body-side control circuit 30, the door-side microprocessor 41 turns a corresponding relay circuit ON to energize the power window unit 51 in a direction to raise a corresponding door window mounted in the slide door.

As is described hereinabove, in the invention, an electromagnetic induction phenomenon (viz., radio) is practically used for transmitting a control signal from the body-side control circuit 30 to the door-side control circuit 40. More specifically, as will be clarified hereinafter, in the invention, the electromagnetic induction phenomenon is effectively used for transmitting control signals between the body-side control circuit 30 and the door-side control circuit 40. Thus, stable and reliable signal transmission is achieved between the two control circuits 30 and 40 even when the body-side and door-side connector parts 20a and 20b (see FIG. 1) of the connector 20 are soiled. Furthermore, because the control signal used in the invention is of a digital type including a plurality of bits, the signal transmission between the two control circuits 30 and 40 can be made by using only a pair of coil elements. Furthermore, since the door-side control circuit 40 is arranged to integrally control all of the electric devices mounted in the door, addition of an electric device for the door can be easily made by only changing a control software.

In the following, operation of the control system 10A of the first embodiment carried out when the slide door is brought to the closed position will be described with reference to FIGS. 1, 11 and 12.

Figure 11:
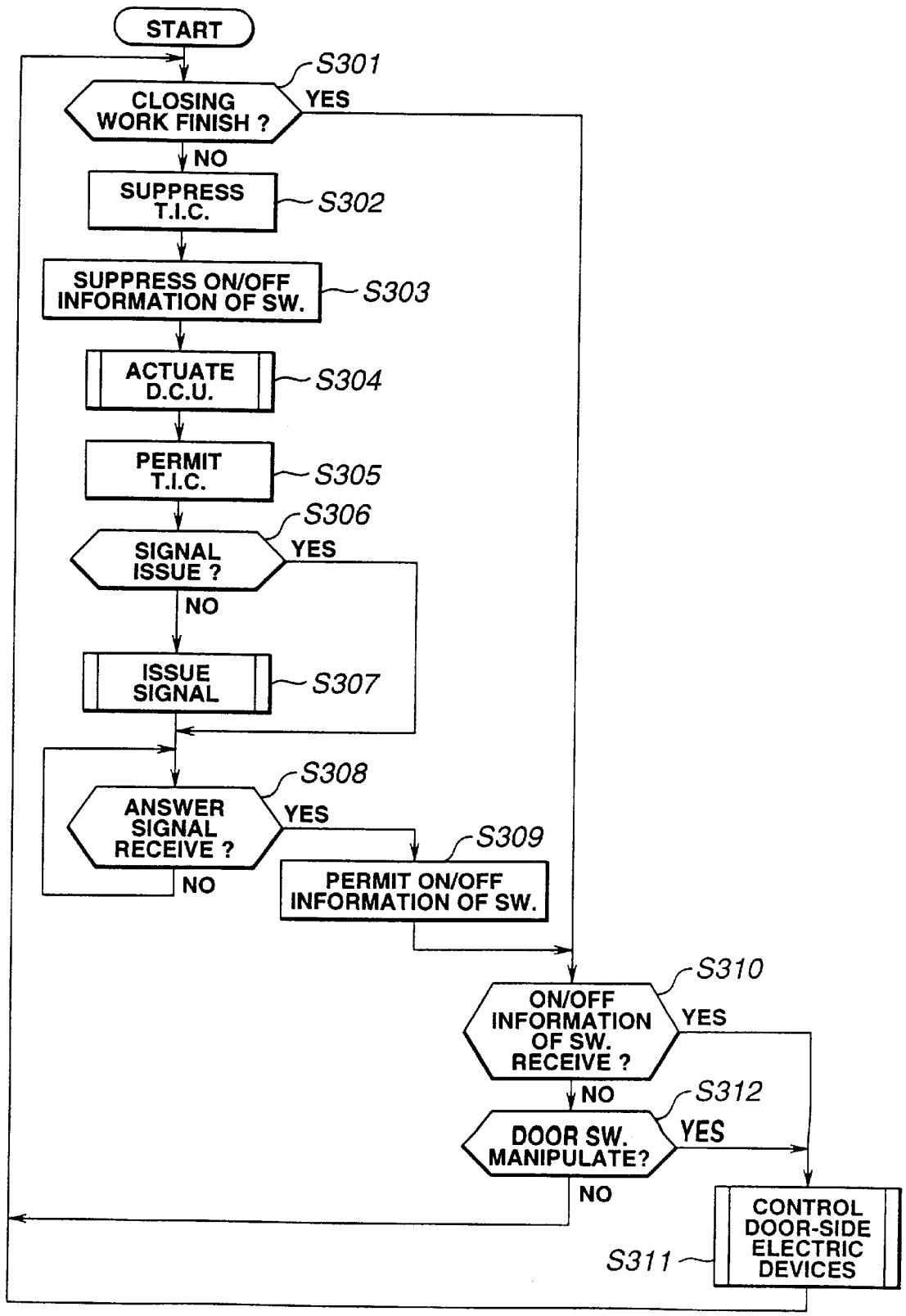
FIG. 11 is a flowchart showing operation steps carried out by the door-side control circuit.

FIG. 11 is a flowchart showing operation steps carried out by the door-side control circuit 40.

When, as is understood from FIG. 1, the slide door is in an open position, the door-side control circuit 40 is not fed with an electric power from the body-side electric power source and thus assumes its rest condition. When the slide door comes to a so-called half-latched position, the connecting pins 26a and 26b of the door-side connector part 20b are brought into contact with the connecting pins 22a and 22b of the body-side connector part 20a. Upon this, the door-side control circuit 40 receives electric power from the body-side electric power source and thus starts its operation. That is, based on a voltage provided by the voltage dividing circuit 49 (see FIG. 3), the door-side microprocessor 41 can recognize that the power of the body-side electric power source has been properly applied to the door-side control circuit 40. Upon this, the door-side microprocessor 41 starts the operation described by the flowchart of FIG. 11.

That is, at step S301, a judgment is carried out as to whether the door closure unit 55 has finished its closing work or not. If NO, that is, when the door closure unit 55 has not finished the closing work, the operation flow goes to step S302. Usually, just after the time when the power supply to the door-side control circuit 40 starts due to arrival of the slide door to the half-latched position, the door closure unit 55 does not finish the closing work. At step S302, acceptance of total information communication between the body-side and door-side control circuits 30 and 40 is suppressed. At step S303, acceptance of ON/OFF information of the control and detecting switches is suppressed.

It is to be noted that the total information communication does not include the ON/OFF information of the control and detecting switches. That is, the total information communication includes the transmission of the "communication recognition mode termination indicating flag" (the item 109, see FIG. 8) and the transmission of the "closure operation completion indicating flag" (the item 125, see FIG. 9). The ON/OFF information of the control and detecting switches means information directly produced by the control and detecting switches, which includes for example ON turning of the power window up-switch (104, see FIG. 8), ON turning of the power window down-switch (105, see FIG. 8), etc.,.

Then, the operation flow goes to step S304. At this step, the door-side control circuit 40 actuates the door closure unit 55 to force the slide door to be shifted to the full-latched position from the half-latched position. During this, there is no radio or wireless communication between the body-side control circuit 30 and the door-side control circuit 40.

Upon completion of the closing work of the door closure unit 55, the CPU 41a of the door-side microprocessor 41 sets in a certain part of the RAM 41c a flag representing the closing work completion. Thereafter, the operation flow goes to step S305 where acceptance of the total information communication is permitted. Then, the operation flow goes to step S306. At this step, a judgement is carried out as to whether a signal (viz., call signal) representing the door closing work completion has been issued to the body-side control circuit 30 or not. If NO, the operation flow goes to step S307. At this step, the signal representing the door closing completion (viz., call signal) is issued to the body-side control circuit 30 (that is, the item 125 of FIG. 9). Upon completion of issuance of the call signal, the CPU 41a of the door-side microprocessor 41 sets in a certain part of the RAM 41c a flag representing the signal issuance completion.

Figure 12:
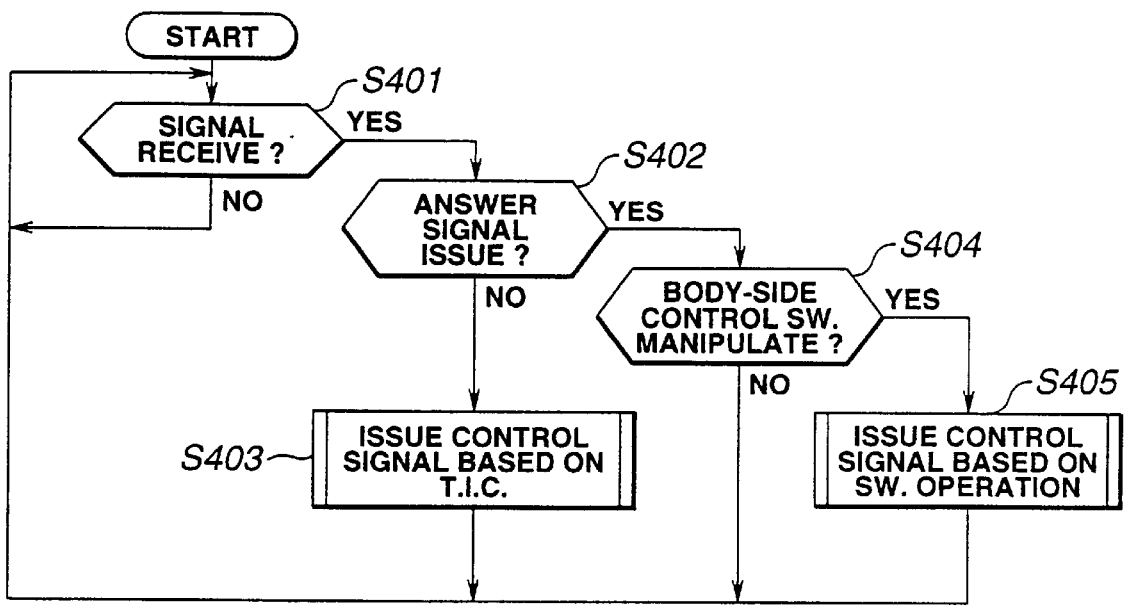
FIG. 12 is a flowchart showing operation steps carried out by the door-side control circuit.

FIG. 12 is a flowchart showing operation steps carried out by the body-side control circuit 30.

The body-side control circuit 30 is waiting for the above-mentioned door closing work completion representing signal (viz., calf signal) issued from the door-side control circuit 40. That is, at step S401, a judgment is carried out as to whether or not the body-side control circuit 30 has received the door closing work completion representing signal (viz., call signal) from the door-side control circuit 40. If YES, the operation flow goes to step S402. At this step, a judgment is carried out as to whether or not the body-side control circuit 30 has issued an answer signal (viz., communication recognition signal), that is, a signal representing a proper receiving of the call signal (viz., the item of 109 of FIG. 8). If NO, the operation flow goes to step S403. At this step, the body-side control circuit 30 issues the answer signal (the item of 109) to the door-side control circuit 40.

Referring back to the flowchart of FIG. 11, at step S308, a judgement is carried out as to whether or not the door-side control circuit 40 has received the above-mentioned answer signal (the item of 109) from the body-side control circuit 30. If YES, the operation flow goes to step S309. At this step, acceptance of ON/OFF information of the control and detecting switches is permitted. Then, the operation flow goes to step 5310 where a judgement is carried out as to whether or not the door-side control circuit 40 has received from the body-side control circuit 30 the control signal representing the ON/OFF information of the control and detecting switches. If YES, the operation flow goes to step S311. At this step, the door-side electric devices are actuated or controlled in accordance with the control signal. For example, upon receiving a control signal instructing to lock the door, the actuator 53 of the electromagnetic door lock unit is energized to lock the door. If NO at step S310, that is, when the door-side control circuit 40 has not received from the body-side control circuit 30 the control signal representing the ON/OFF information of the control and detecting switches, the operation flow goes to step 5312. At this step, a judgement is carried out as to whether the door-side control switches are manipulated or not. If YES, at step S311, the door-side electric devices are actuated or controlled in accordance with the manipulation of the door-side control switches. If NO, the operation flow goes back to step S301.

Referring to the flowchart of FIG. 12 again, if YES at step S402, that is, when the body-side control circuit 30 has issued the answer signal (the item of 109 of FIG. 8), the operation flow goes to step S404. At this step, a judgement is carried out as to whether the body-side control switches are manipulated or not. If YES, the operation flow goes to step 5405. At this step, a control signal is issued to the door-side control circuit 40 to operate the door-side electric devices in accordance with the manipulation of the body-side control switches.

As is described hereinabove, in the invention, when the slide door is moved to the fully closed position, the door-side control circuit 40 issues to the body-side control circuit 30 a call signal representing the completion of the closing of the slide door. Upon this, the body-side control circuit 30 issues to the door-side control circuit 40 an answer signal conforming the completion of the slide door closing. Upon this, the door-side control circuit 40 permits acceptance of the ON/OFF information of the control and detecting switches from the body-side control circuit 30. That is, in the invention, when the slide door is in an unstable condition, such as, in a half-latched condition, the communication between the door-side and body-side control circuits 40 and 30 is not established. In other words, in the invention, such communication is assuredly and reliably made because the communication is set to start when the slide door comes to the stable, that is, fully closed position. Accordingly, the door-side electric devices can be assuredly and reliably controlled by both the body-side control switches and door-side control switches.

Figure 13:
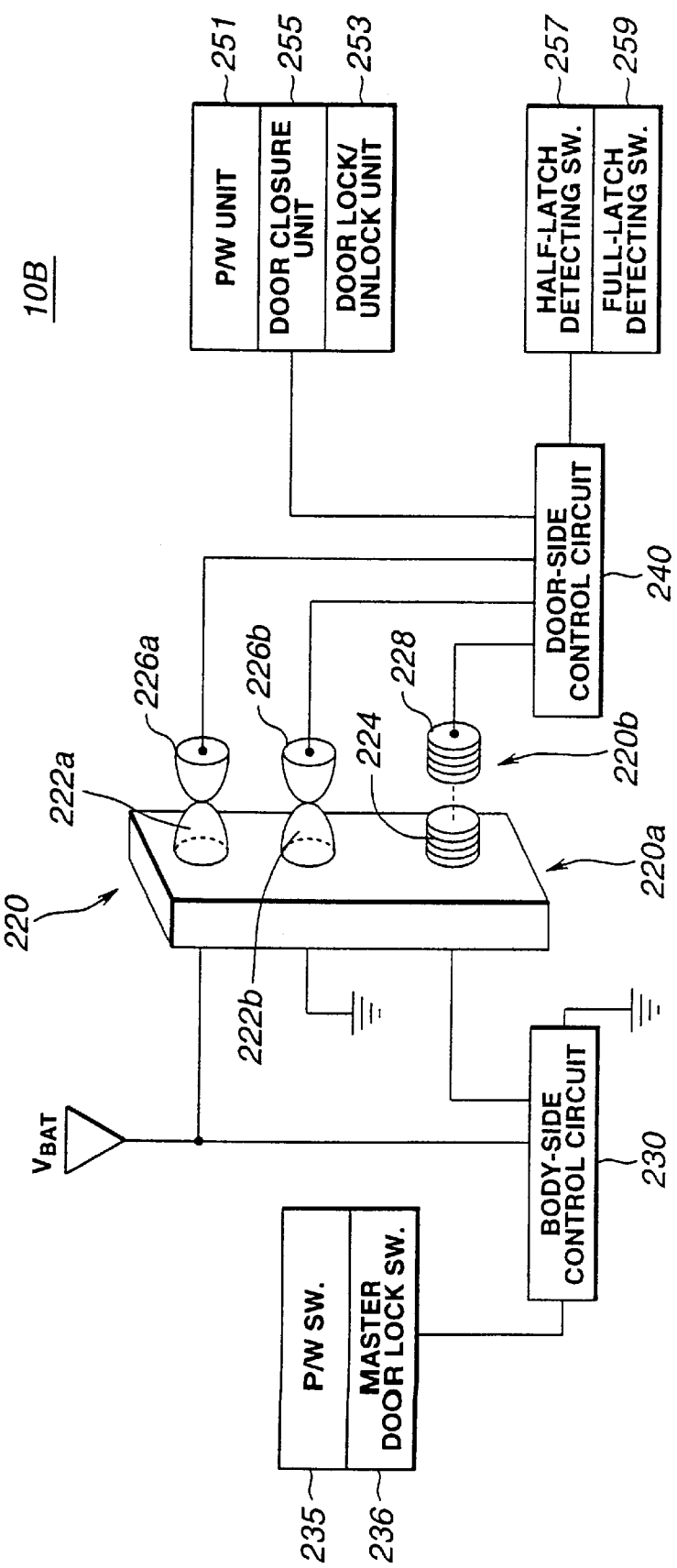
FIG. 13 is a block diagram of a control system which is a second embodiment of the present invention.

Referring to FIG. 13, there is shown a control system 10B which is a second embodiment of the present invention.

In the above-mentioned first embodiment 10A of FIG. 1, a pair of coil elements 24a and 24b (or, 28a and 28b) are mounted to each connector part 20a or 20b of the connector 20. However, in the second embodiment 10B, only one coil element 224 or 228 is mounted to each connector part 220a or 220b, as will become clarified as the description proceeds. That is, in the second embodiment 10B, each coil element 224 or 228 serves as both the signal transmission and receiving coil elements. That is, a bidirectional radio communication is carried out by using an coil element mounted on the vehicle body and another coil element mounted on the slide door.

As is seen from FIG. 13, the control system 10B of the second embodiment comprises generally a body-side control circuit 230 which is installed in a vehicle body and a door-side control circuit 240 which is installed in a slide door. A power window switch 235 and a master door lock switch 236 which are arranged in a driver's cabin are connected to the body-side control circuit 230. A power window unit 251, a door closure unit 255 and a door lock/unlock unit 253 which are installed in the slide door are connected to the door-side control circuit 240. A half-latch detecting switch 257 and a door handle switch 259 which are also installed in the slide door are connected to the door-side control circuit 240, as shown.

Between the body-side control circuit 230 and the door-side control circuit 240, more specifically, between the vehicle body and the slide door, there is arranged a connector 220 for providing between the two control circuits 230 and 240 an electric connection as well as a radio or wireless connection.

The connector 220 comprises a body-side connector part 220a mounted to the vehicle body and a door-side connector part 220b mounted to the slide door. The two connector parts 220a and 220b are so arranged that they face each other when the slide door comes to or near its closed position in a door opening formed in the vehicle body.

Similar to the connector 20 of the above-mentioned first embodiment 10A, the connector 220 used in the second embodiment 10B comprises a pin type connector section (222a, 222b) and (226a, 226b) through which an electric power supply can be made from a body-side electric power source (viz., battery) to the door-side control circuit 240, and a coil element section (224 and 228) through which the radio or wireless communication can be made between the body-side control circuit 230 and the door-side control circuit 240.

The body-side and door-side control circuits 230 and 240 are substantially the same as the above-mentioned body-side and door-side control circuits 30 and 40 of the first embodiment BOA except that in the second embodiment 10B, each circuit 230 or 240 employs an integrated circuit in place of the signal transmission circuit 32 or 42 and the signal receiving circuit 33 or 43 of the first embodiment 10A. The integrated circuits for the body-side and door-side control circuits 230 and 240 are substantially the same in construction.

Figure 14:
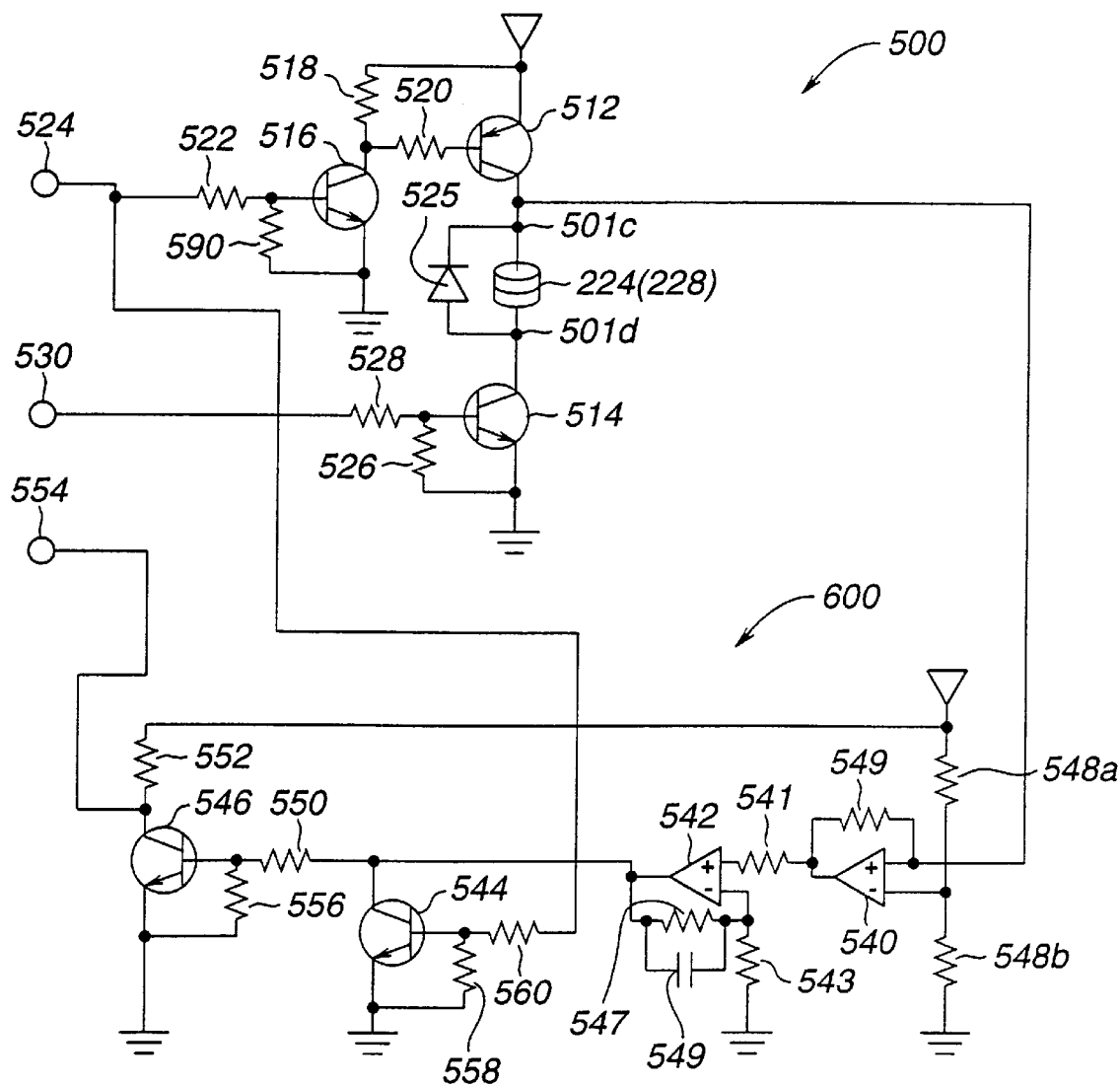
FIG. 14 shows an integrated circuit employed in the second embodiment, which includes a signal transmitting part, a signal receiving part and a switching part.

As shown in FIG. 14, each integrated circuit generally comprises a signal transmitting part 500, a signal receiving part 600 and a switching part.

The signal transmitting part 500 comprises generally first, second and third transistors 516, 512 and 514. The second transistor 512 is of a PNP type and its emitter is connected to an electric power source. The collector of the second transistor 512 is connected to one end 501c of the coil element 224 (or 228). A diode 525 extends between the ends 501c and 501d of the coil element 224 (or 228). The end 501c servers as one output terminal of the transmitting part 500. The other end 501d of the coil element 224 (or 228) is connected to the collector of the third transistor 514 which is of a NPN type. The emitter of the third transistor 514 is earthed, that is, connected to the body or door of the vehicle. That is, the other end 501d servers as the other output terminal of the transmitting part 500. The first transistor 516 is of a NPN type and its collector is connected through a resistor 518 to the electric power source, and connected through a resistor 520 to a base of the second transistor 512. The emitter of the first transistor 516 is earthed and connected through a resistor 590 to the base of the same. The base of the first transistor 516 is connected through a resistor 522 to a transmitter/receiver switching terminal 524. That is, to this terminal, there is applied a transmitting/receiving switching signal. The base of the third transistor 514 is earthed through a resistor 526, and is connected through a resistor 528 to a control signal output terminal 530. That is, from this terminal 530, a control signal is issued to a counter part.

The signal receiving part 600 comprises generally a comparator 540, an operational amplifier 542, a fourth transistor 544 and a fifth transistor 546. The positive input terminal of the comparator 540 is connected to the end 501c of the above-mentioned coil element 224 (or 228). To the negative input terminal of the comparator 540, there is applied a threshold voltage provided by dividing the electric power source voltage by two resistors 548*a* and 548*b*. A resistor 549 extends between the positive input terminal of the comparator 540 and an output terminal of the same. With this resistor 549, the comparator 540 can have a hysteretic characteristic. The output terminal of the comparator 540 is connected through a resistor 541 to the positive input terminal of the operational amplifier 542. The negative input terminal of the operational amplifier 542 is earthed through a resistor 543. The negative input terminal of the operational amplifier 542 and the output of the same are connected through a circuit in which a resistor 547 and a capacitor 549 are arranged in parallel. The base of the fourth transistor 544 is earthed through a resistor 558 and connected through a resistor 560 to the transmitter/receiver switching terminal 524. The emitter of the fourth transistor 544 is earthed and the collector of the same is connected to the output terminal of the operational amplifier 542, and connected through a resistor 550 to the base of the fifth transistor 546. The base of the fifth transistor 546 is earthed through a resistor 556. The emitter of the fifth transistor 546 is earthed and the collector of the same is connected through a resistor 552 to the electric power source. The collector of the fifth transistor 546 is connected to a control signal input terminal 554. Usually, the control signal input terminal 554 is connected to an interruption port of a corresponding microprocessor, such as the microprocessor 31 or 41 used in the first embodiment 10A.

Figure 15:
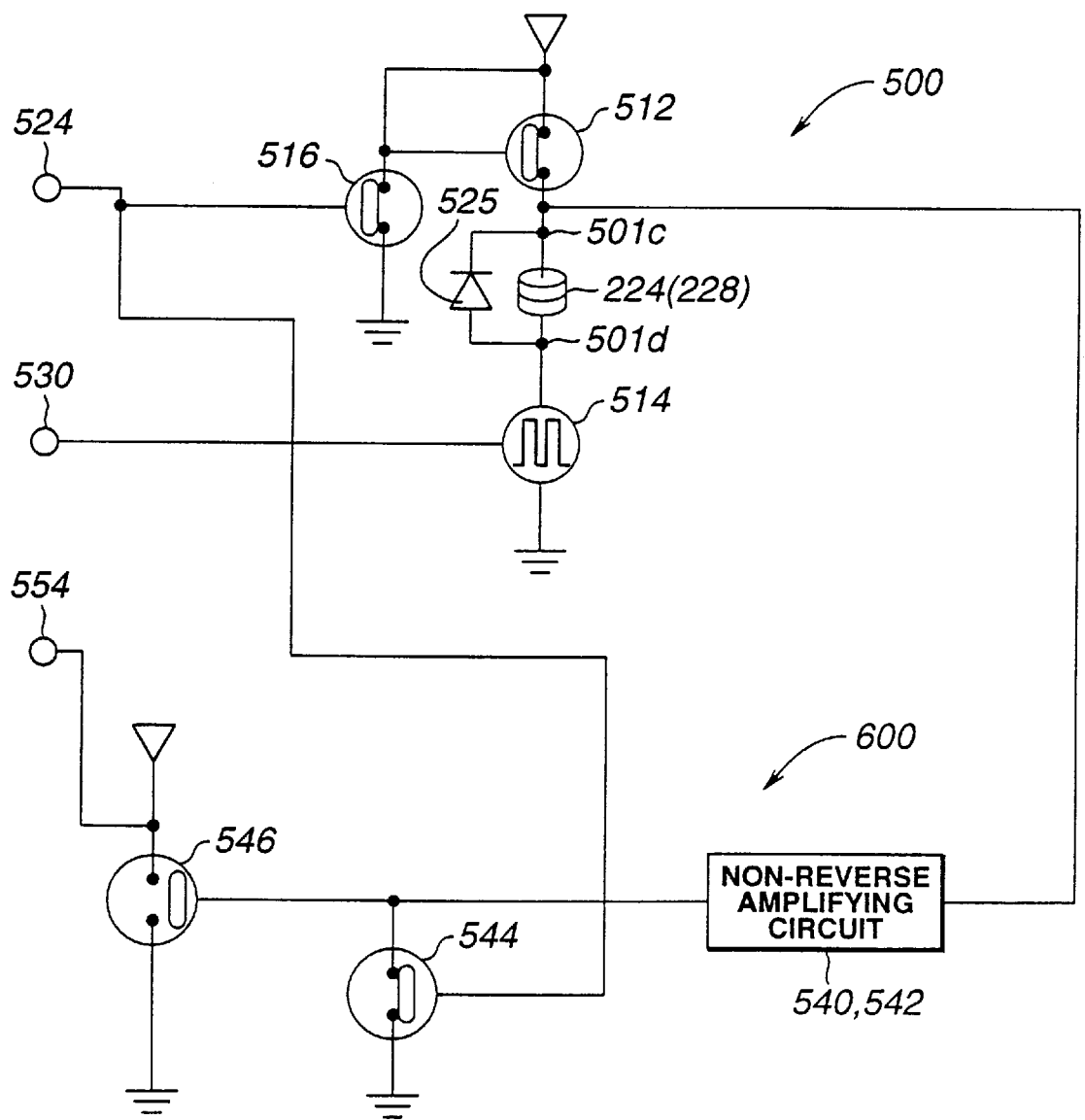
FIG. 15 shows the integrated circuit in the signal transmitting mode.

FIG. 15 shows the integrated circuit in a signal transmitting mode wherein the same is serving as a signal transmitting circuit, that is, the coil element 224 (or 228) is serving as a signal transmitting element. In this signal transmitting mode, a higher level signal is applied to the transmitter/receiver switching terminal 524 and a control signal is applied to the control signal output terminal 530. Upon receiving the higher level signal, the first transistor 516 is turned ON causing the base of the second transistor 512 to assume a lower level, and thus the second transistor 512 is turned ON. Accordingly, the end 501*c* of the coil element 224 (or 228) is connected to the electric power source. When, under this condition, the third transistor 514 is subjected to ON/OFF operation due to work of the control signal applied thereto, the coil element 224 (or 228) permits a current flow therethrough producing a corresponding magnetic flux in accordance with the control signal.

The higher level signal at the switching terminal 524 is applied also to the base of the fourth transistor 544. Thus, during the signal transmitting mode, the fourth transistor 544 is kept ON causing the base of the fifth transistor 546 to assume a lower level, and thus the fifth transistor 546 is kept OFF. Accordingly, during the signal transmitting mode, the control signal input terminal 554 is constantly applied with a higher level signal. The microprocessor receives a control signal whose waveform is reversed to that of the control signal from the signal input terminal 554, and thus during the signal transmitting mode, the microprocessor judges that there is no control signal received thereto.

Figure 16:
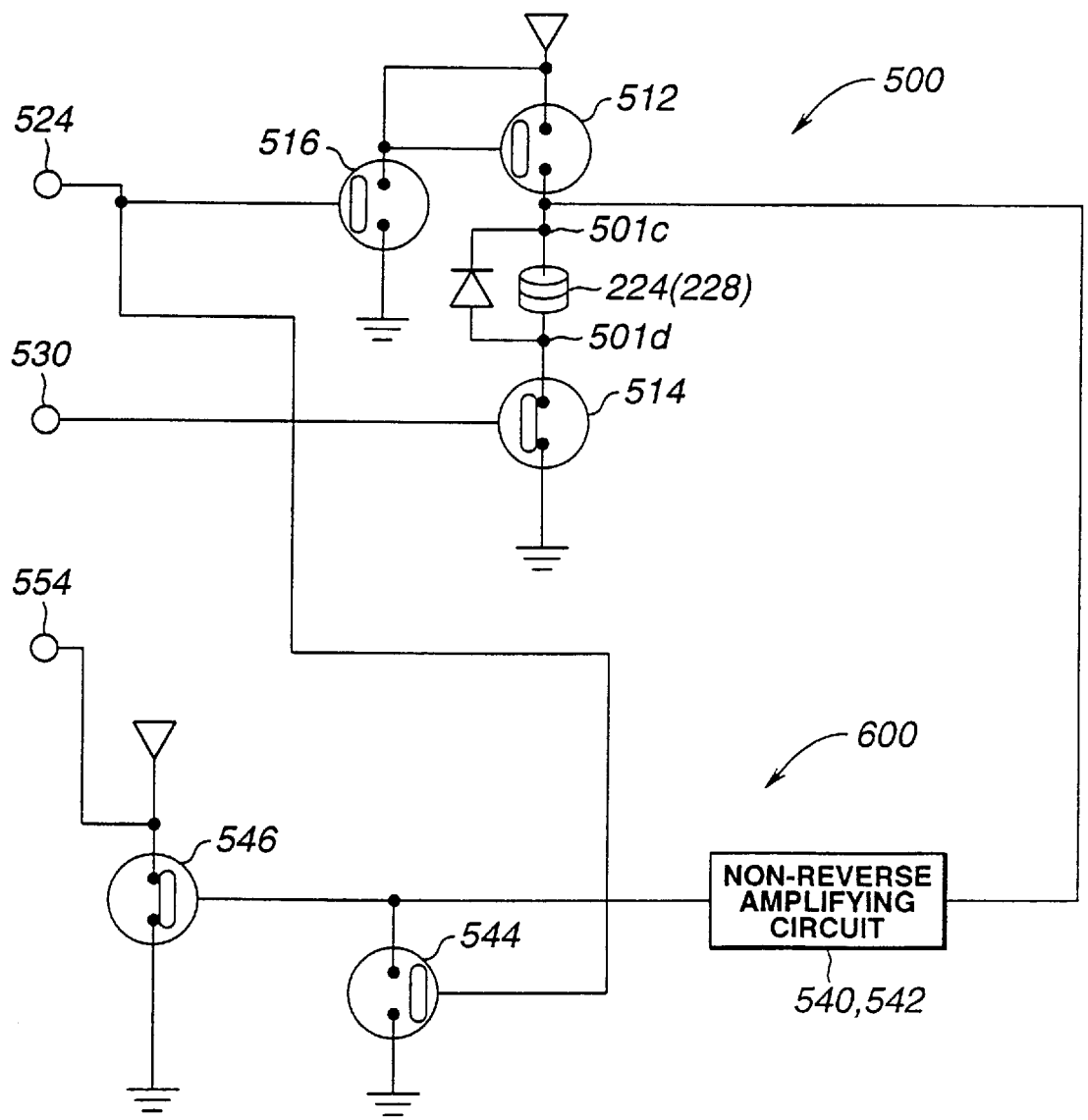
FIG. 16 shows the integrated circuit in the signal receiving mode.

FIG. 16 shows the integrated circuit in a signal receiving mode wherein the same is serving as a signal receiving circuit, that is, the coil element 224 (or 228) is serving as a signal receiving element. In this signal receiving mode, a lower level signal is applied to the transmitter/receiving switching terminal 524 and a higher level signal is constantly applied to the control signal output terminal 530. Upon receiving the lower level signal, the first transistor 516 is turned OFF causing the base of the second transistor 512 to assume a lower level, and thus the second transistor 512 is turned OFF. Accordingly, the end 501*c* of the coil element 224 (or 228) is disconnected from the electric power source. Since the base of the third transistor 514 is applied with the higher level signal, the transistor 514 assumes ON condition. Thus, the other end 501*d* of the coil element 224 (or2 28) becomes earthed. Accordingly, the coil element 224 (or 228) is functionally isolated from the signal transmitting part 500. That is, the coil element 224 (or 228) becomes electrically connected to the comparator 540 of the signal receiving part 600.

Upon receiving the lower level switching signal from the transmitter/receiver switching terminal 524, the base of the fourth transistor 544 assumes a lower level, and thus, during the signal receiving mode, the fourth transistor 544 is kept OFF. As a result, the base voltage of the fifth transistor 546 depends on the output level of the operational amplifier 542. That is, the fifth transistor 546 is subjected to ON/OFF operation in accordance with the output level of the operational amplifier 542. Accordingly, from the signal input terminal 554, a control signal is outputted whose waveform is reversed to that of the control signal issued from the operational amplifier 542.

As is described hereinabove, by applying the three terminals 524, 530 and 554 with suitable signals, the coil element 224 (or 228) can be changed as a signal transmitting element or a signal receiving element. That is, in the second embodiment 10B, a bidirectional radio communication is carried out between the body-side and door-side control circuits 230 and 240 by only using a pair of coil elements 224 and 228, one being mounted on the vehicle body and the other being mounted on the slide door. Thus, as compared with the connector 20 used in the first embodiment 10A, the connector 220 in the second embodiment 10B can be made compact in size.

In the following, operation of the control system 10B carried out when the slide door is brought to the closed position will be described with reference to FIGS. 13, 17 and 18.

Figure 17:
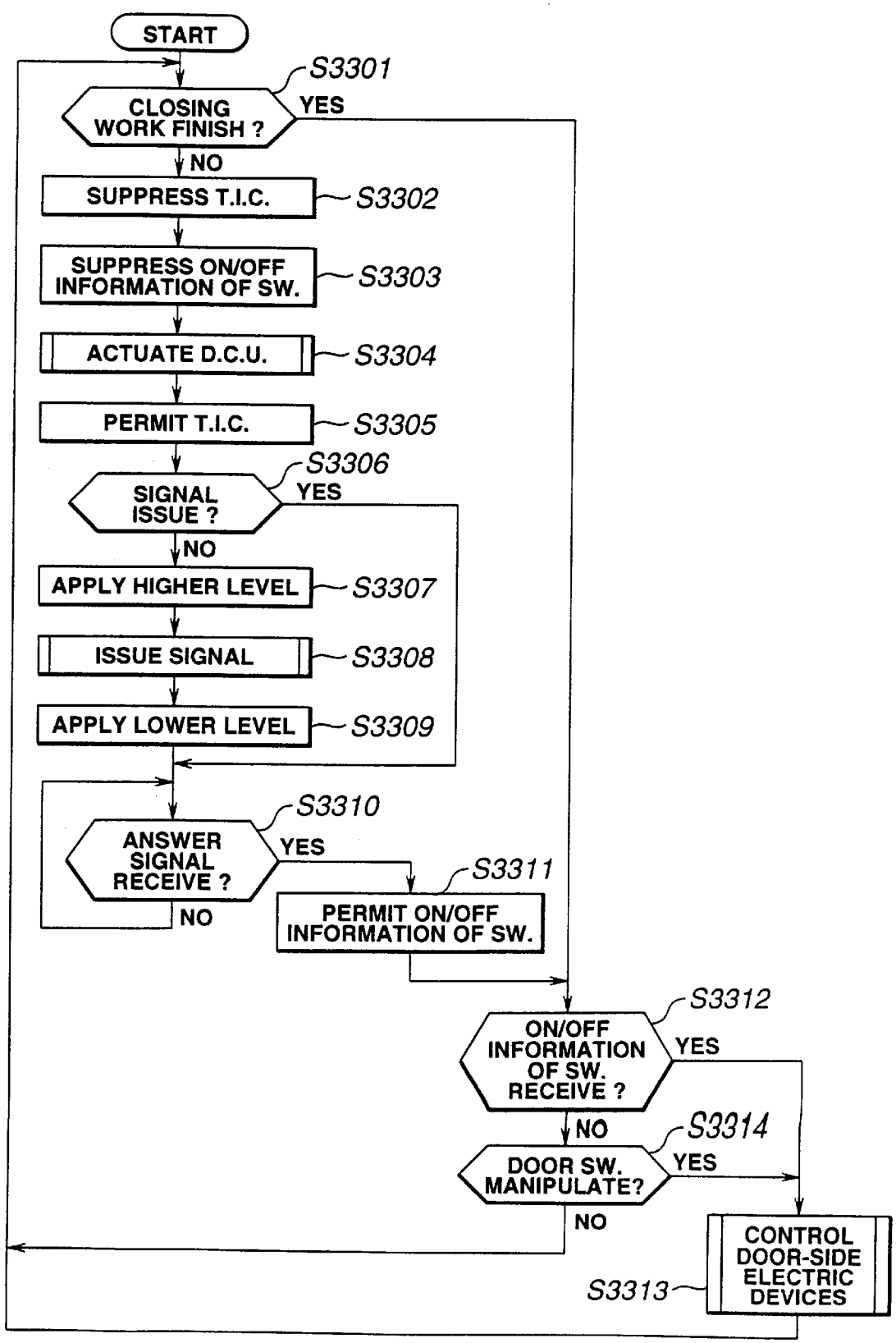
FIG. 17 is a flowchart showing operation steps carried out by the door-side control circuit in the second embodiment.

FIG. 17 is a flowchart showing operation steps carried out by the door-side control circuit 240.

When, as is understood from FIG. 13, the slide door is in an open position, the door-side control circuit 240 is not fed with an electric power from the body-side electric power source and thus assumes its rest condition. When the slide door comes to a so-called half-latched position, the connecting pins 226*a* and 226*b* of the door-side connector part 220*b* are brought into contact with the connecting pins 222*a* and 222*b* of the body-side connector part 220*a*. Upon this, the door-side control circuit 240 receives electric power from the body-side electric power source and thus starts its operation. That is, based on a voltage provided by a voltage dividing circuit, the door-side microprocessor can recognize that the power of the body-side electric power source has been properly applied to the door-side control circuit 240. Upon this, the door-side microprocessor starts the operation described by the flowchart of FIG. 17.

That is, at step S3301, a judgment is carried out as to whether the door closure unit 255 has finished its closing work or not. If NO, that is, when the door closure unit 255 has not finished the closing work, the operation flow goes to step S3302. At step S3302, acceptance of total information communication between the body-side and door-side control circuits 230 and 240 is suppressed, and at step S3303, acceptance of ON/OFF information of the control and detecting switches is suppressed.

As is mentioned in the part of the first embodiment 10A, the total information communication does not include the ON/OFF information of the control and detecting switches. That is, the total information communication includes the transmission of the "communication recognition mode termination indicating flag" (the item 109, see FIG. 8) and the transmission of the "closure operation completion indicating flag" (the item 125, see FIG. 9). The ON/OFF information of the control and detecting switches means information directly produced by the control and detecting switches, which includes for example ON turning of the power window up-switch (104, FIG. 8), ON turning of the power window down-switch (105, FIG. 8), etc.,.

Then, the operation flow goes to step S3304. At this step, the door-side control circuit 240 actuates the door closure unit 255 to force the slide door to be shifted to the full-latched position from the half-latched position. During this, there no radio or wireless communication between the body-side control circuit 230 and the door-side control circuit 240.

Upon completion of the closing work of the door closure unit 255, the CPU of the door-side microprocessor sets in a certain part of a RAM a flag representing the closing work completion. Then, at step S3305, acceptance of the total information communication is permitted. Then, the operation flow goes to step S3306. At this step, a judgement is carried out as to whether a signal representing the door closing work completion has been issued to the body-side control circuit 230 or not. If NO, the operation flow goes to step S3307. At this step, a higher level signal is applied to the transmitter/receiving switching terminal 524 to cause the coil element 228 (see FIG. 13) to serve as a signal transmitting means. Then, the operation flow goes to step S3309. At this step, a signal representing the door closing work completion is issued to the body-side control circuit 230 (that is, the item 125 of FIG. 9). Upon completion of issuance of such signal, the CPU of the door-side microprocessor sets in a certain part of the RAM a flag representing the signal issuance completion. Then, the operation flow goes to step S3309. At this step, a lower level signal is applied to the transmitter/receiving switching terminal 524 to cause the coil element 228 (see FIG. 13) to serve as a signal receiving means.

Figure 18:
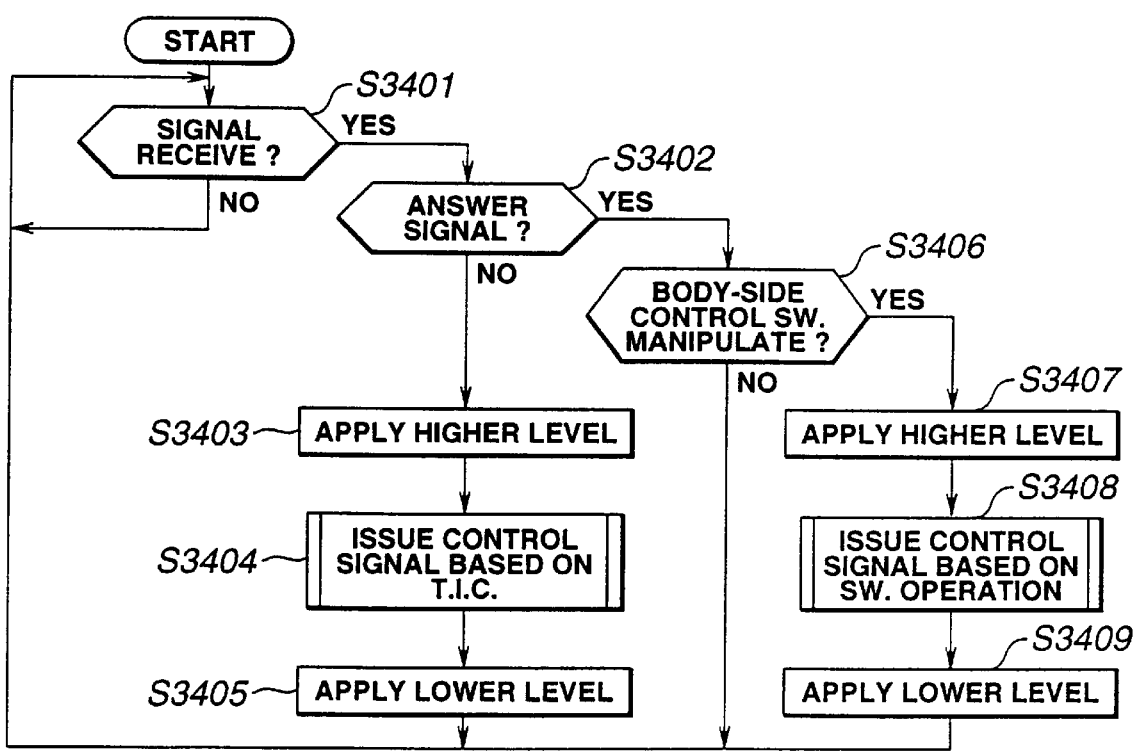
FIG. 18 is a flowchart showing operation steps carried out by the body-side control circuit in the second embodiment.
Figure 19:
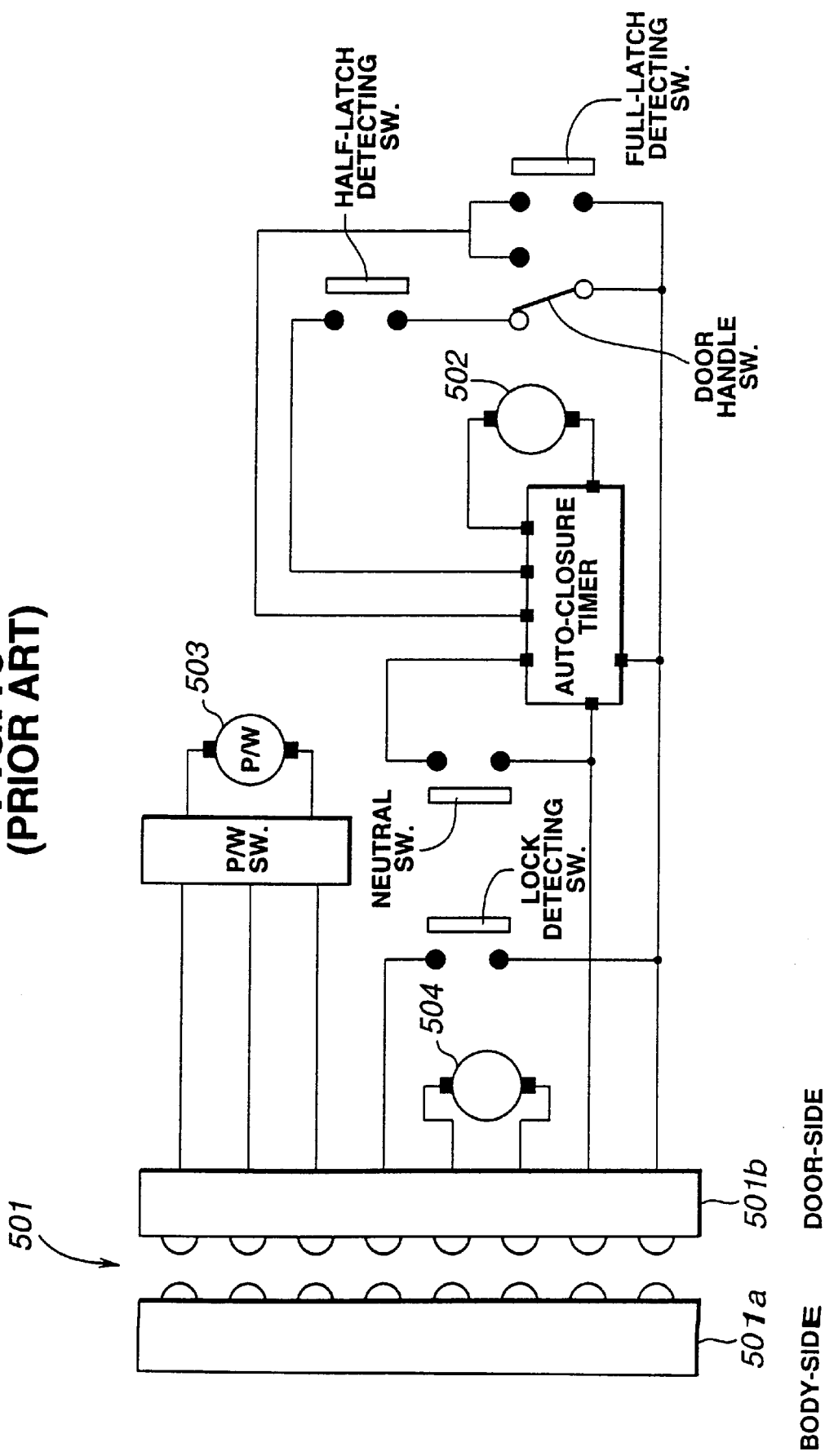
FIG. 19 is a block diagram of a conventional control system.

FIG. 18 is a flowchart showing operation steps carried out by the body-side control circuit 230.

Initially, the coil element 224 is set to serve as a signal receiving means by applying the transmitter/receiver switching terminal 524 with a lower level signal, and is waiting for the above-mentioned door closing work completion representing signal issued from the door-side control circuit 240. That is, at step S3401, a judgment is carried out as to whether or not the body-side control circuit 230 has received the door closing work completion representing signal (viz., call signal) from the door-side control circuit 240. If YES, the operation flow goes to step S3402. At this step, a judgment is carried out as to whether or not the body-side control circuit 230 has issued an answer signal (viz., communication recognition signal), that is, a signal representing a proper receiving of the call (the item of 109 of FIG. 8). If NO, the operation flow goes to step S3403 to apply the transmitter/receiver switching terminal 524 with a higher level signal. With this, the coil element 224 is set as a signal transmitting means. Then, at step S3404, the body-side control circuit 230 issues the answer signal (the item of 109) to the door-side control circuit 240. Then, the operation flow goes to step S3405 to apply the terminal 524 with a lower level signal to set the coil element 224 as a signal receiving means.

Referring back to the flowchart of FIG. 17, at step 53310, a judgement is carried out as to whether or not the door-side control circuit 240 has received the above-mentioned answer signal (the item of 109) from the body-side control circuit 230. If YES, the operation flow goes to step S3311. At this step, acceptance of ON/OFF information of the control and detecting switches is permitted. As is seen from the above, when the slide door comes to its fully closed position, the door-side control circuit 240 issues to the body-side control circuit 230 a first or call signal representing the full closing of the slide door. After receiving from the body-side control circuit 230 a second or answer signal representing proper receiving of the first signal, the door-side control circuit 240 permits acceptance of a control signal from the body-side control circuit 230.

At operation step S3312, a judgement is carried out as to whether or not the door-side control circuit 240 has received from the body-side control circuit 230 a control signal representing the ON/OFF information of the control and detecting switches. If YES, the operation flow goes to step S3313. At this step, the door-side electric devices are actuated or controlled in accordance with the control signal. For example, upon receiving a control signal instructing to lock the door, the actuator of the door lock/unlock unit 253 is energized to lock the door. If NO at step S3312, that is, when the door-side control circuit 240 has not received from the body-side control circuit 230 the control signal representing the ON/OFF information of the control and detecting switches, the operation flow goes to step S3314. At this step, a judgement is carried out as to whether the door-side control switches have been manipulated or not. If YES, at step S3313, the door-side electric devices are actuated or controlled in accordance with the manipulation of the door-side control switches. If No, the operation flow goes back to step 53301.

Referring to the flowchart of FIG. 18 again, if YES at step S3402, that is, when the body-side control circuit 230 has issued the answer signal, the operation flow goes to step S3406. At this step, a judgment is carried out as to whether the body-side control switches are manipulated or not. If YES, that is, when the body-side control switches are manipulated, the operation flow goes to step 53407 to apply the switching terminal 524 with a higher level signal to make the coil element 224 serve as a signal transmitting means. Then, at step S3408, a control signal is issued to the door-side control circuit 240 to operate the door-side electric devices in accordance with the manipulation of the body-side control switches. Then, at step 53409, a lower signal is applied to the switching terminal 524 to make the coil element 224 serve as a signal receiving means.

As is seen from the above description, in the present invention, the substantial signal transmission between the door-side control circuit 40 or 240 and the body-side control circuit 30 or 230 is permitted only when the slide door comes to the fully-closed locked position wherein the door is quite stable. Thus, control of the door-side electric devices in accordance with operation of the body-side and door-side control and detecting switches is assuredly and reliably made under such stable condition.

In the invention, the electromagnetic induction phenomenon ( viz., radio) is practically used for transmitting control signals between the door-side control circuit 40 or 240 and the body-side control circuit 30 or 230. Thus, stable and reliable signal transmission is achieved between the two control circuits even when the door-side and body-side connector parts of the connector 20 or 220 are soiled.

Because the control signal used in the invention is of a digital type including a plurality of bits, the signal transmission between the two control circuits 30 or 230 and 230 and 240 can be precisely made even when some noises are produced.

Since the door-side control circuit 40 or 240 is arranged to integrally control all of the electric devices mounted on the slide door addition of another electric device for the door can be easily made by only changing a software for the microprocessor.

If desired, the following modifications may be employed in the present invention.

In place of the pulse wise modulation (PWM) transmission method, other conventional transmission method may be used.

In the second embodiment 10B, the third transistor 514 (see FIG. 14) is arranged on the earthed side with respect to the coil element 224 (or 228). However, if desired, the third transistor 514 may be arranged on the side of the electric power source.

Furthermore, if desired, the third transistor 514 may be removed. In this case, the second transistor 412 is arranged to have a modulation function. That is, under the signal transmission mode, the pulse wise modulation is carried out by the second transistor 412, and under the signal receiving mode, the second transistor 412 is kept OFF disconnecting the coil element 224 (or 228) from the electric power source.

What is claimed is:

1. A control system for use in a motor vehicle which includes a vehicle body and a slide door, comprising:
    a body-side control circuit installed in said vehicle body and including;
    a door-side control circuit installed in said slide door;
    two coil elements respectively mounted to said vehicle body and said slide door and respectively connected to said body-side and door-side control circuits, said two coil elements coming close to each other when said slide door comes to its closed position relative to a door opening formed in said vehicle body; and
    means for providing a radio or wireless communication between the body-side and door-side control circuits by practically using an electromagnetic induction generated between the two coil elements.

2. A control system as claimed in claim 1, in which each of said body-side and door-side control circuits comprises:
    a signal transmission circuit which applies the coil element with a control signal which is to be transmitted therefrom; and
    a signal receiving circuit which, based on an electromotive force generated by the coil element, regenerates a control signal which is transmitted thereto; and
    a switching circuit which selectively connects one of said signal transmission and receiving circuits to the coil element.

3. A control system as claimed in claim 2, further comprising a control means which controls said switching circuit in such a manner that when the door-side control circuit assumes a signal transmission mode wherein said signal transmission circuit is connected with the corresponding coil element, said body-side control circuit assumes a signal receiving mode wherein said signal receiving circuit is connected with the corresponding coil element, and when the body-side control circuit assumes a signal transmission mode wherein the signal transmission circuit is connected with the corresponding coil element, said door-side control circuit assumes a signal receiving mode wherein said signal receiving circuit is connected with the corresponding coil element.

4. A control system as claimed in claim 3, in which said control means comprises transistors which are arranged to connect said signal transmission circuit to said coil element when the control circuit assumes said signal transmission mode and to connect said signal receiving circuit to said coil element when the control circuit assumes said signal receiving mode.

5. A control system as claimed in claim 4, in which the control signal is transmitted between said door-side and body-side control circuits through the coil elements in a serial transmission manner, said control signal being of a digital type.

6. In a motor vehicle including a vehicle body, a slide door, electric devices mounted in said slide door, an electric door closure unit for shifting the slide door from a half-latched position to a full-latched position when actuated, a first group of control switches mounted in said vehicle body, and a second group of control switches mounted in said slide door,
    a control system for controlling the door-mounted electric devices in accordance with operation of said first and second group of switches, comprising:
        a body-side control circuit installed in said vehicle body and electrically connected to said first group of control switches;
        a door-side control circuit installed in said slide door and electrically connected to said second group of control switches, the door-mounted electric devices and said electric door closure unit; and
        a connector arranged between the vehicle body and the slide door, which comprises a pin type connection section through which an electric power supply is achieved from the body-side control circuit to said door-side control circuit when the slide door comes to a half-latched position under closing movement thereof, and a coil element section through which radio connection is achieved between said body-side and door-side control circuits so that the door-mounted electric devices are controlled in accordance with operation of the first and second group of control switches,
    wherein said door-side control circuit suppresses the operation of said coil element section of the connector until the electric door closure unit shifts the slide door from the half-latched position to the full-latched position.

7. A control system as claimed in claim 6, in which connector comprises:
    a first connector part mounted to said vehicle body, said first-connector part including connecting pins to which the body-mounted electric power source is connected, and an coil element unit to which said body-side control circuit is connected; and
    a second connector part mounted to said slide door, said second connector part including connecting pins to which an power input section of the door-side control circuit is connected, and an coil element unit to which said door-side control circuit is connected.

8. A control system as claimed in claim 7, in which the coil element unit of each of said first and second connector parts of the connector comprises:
    a signal transmitting coil element connected to the corresponding control circuit for transmitting a control signal; and
    a signal receiving coil element connected to the corresponding control circuit for receiving a control signal.

9. A control system as claimed in claim 7, in which the coil element unit of each of said first and second connector parts of the connector comprises a coil element which is connected to the corresponding control circuit to serve as both signal transmitting and receiving coil elements.

* * * * *